(12) United States Patent
Zalzalah et al.

(10) Patent No.: US 9,674,747 B2
(45) Date of Patent: Jun. 6, 2017

(54) ATTACHMENT, HANDOVER, AND TRAFFIC OFFLOADING BETWEEN 3GPP RANS AND WI-FI RANS

(71) Applicant: Telefonaktiebolaget L M Ericsson (publ), Stockholm (SE)

(72) Inventors: Luay Zalzalah, Ottawa (CA); Najeh Abu-Farha, Ottawa (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 224 days.

(21) Appl. No.: 14/416,961

(22) PCT Filed: Jan. 16, 2015

(86) PCT No.: PCT/IB2015/050352
§ 371 (c)(1),
(2) Date: Jan. 23, 2015

(87) PCT Pub. No.: WO2016/113601
PCT Pub. Date: Jul. 21, 2016

(65) Prior Publication Data
US 2016/0212666 A1    Jul. 21, 2016

(51) Int. Cl.
*H04W 4/00* (2009.01)
*H04W 36/22* (2009.01)
(Continued)

(52) U.S. Cl.
CPC ............ *H04W 36/14* (2013.01); *H04W 28/16* (2013.01); *H04W 36/26* (2013.01); *H04W 48/18* (2013.01);
(Continued)

(58) Field of Classification Search
CPC ..... H04W 36/14; H04W 28/16; H04W 36/26; H04W 48/18; H04W 36/38;
(Continued)

(56) References Cited

U.S. PATENT DOCUMENTS 6,363,065 B1    3/2002  Thornton et al.
9,270,585 B2    2/2016  Manion et al.
(Continued)

FOREIGN PATENT DOCUMENTS

EP    2104388 A1    9/2009
EP    2677773 A1    12/2013
(Continued)

OTHER PUBLICATIONS

Bohák, A. et al., "An Authentication scheme for fast handover between WiFi Access Points", Invited Paper, WICON 2007, Oct. 22, 2007, pp. 1-9, retrieved on Jan. 21, 2015, retrieved from internet: https://www.crysys.hu/publications/files/BohakBD07wicon.pdf.
(Continued)

*Primary Examiner* — Kiet Tang
(74) *Attorney, Agent, or Firm* — Coats and Bennett, PLLC

(57) ABSTRACT

According to one aspect of the present disclosure, a method (150) is implemented by a base station (42, 700) that supports a 3GPP RAN (56) and has an associated Wi-Fi RAN (58) that is either supported by the base station (42, 700) or is supported by an access point (710) colocated with the base station (42, 700). The base station (42, 700) receives a request from a UE (54, 800). If the request is for a current Wi-Fi service capability of the base station (42, 700), the base station (42, 700) determines whether the Wi-Fi RAN has sufficient available resources to support QoS requirements of the UE (54, 800), and transmits a corresponding response to the UE (54, 800). If the response indicates that the Wi-Fi RAN (58) has sufficient available resources, the base station (42, 700) also transmits Wi-Fi credentials to the UE (54, 800) to enable the UE (54, 800) to access the Wi-Fi RAN (58). If sufficient available resources to support the
(Continued)

QoS requirements are not available, Wi-Fi credentials are not sent to the UE (54, 800).

28 Claims, 17 Drawing Sheets

(51) Int. Cl.

| | | |
|---|---|---|
| *H04W 28/10* | (2009.01) | |
| *H04W 36/14* | (2009.01) | |
| *H04W 28/16* | (2009.01) | |
| *H04W 36/26* | (2009.01) | |
| *H04W 48/18* | (2009.01) | |
| *H04W 36/38* | (2009.01) | |
| *H04W 36/00* | (2009.01) | |
| *H04W 88/10* | (2009.01) | |

(52) U.S. Cl.
CPC .... *H04W 36/0038* (2013.01); *H04W 36/0061* (2013.01); *H04W 36/0066* (2013.01); *H04W 36/38* (2013.01); *H04W 88/10* (2013.01)

(58) Field of Classification Search
CPC ............. H04W 36/0038; H04W 88/10; H04W 36/0066; H04W 36/0061
See application file for complete search history.

(56) References Cited

U.S. PATENT DOCUMENTS

| | | |
|---|---|---|
| 2005/0130658 A1 | 6/2005 | Stephens |
| 2008/0008159 A1 | 1/2008 | Bourlas et al. |
| 2008/0170550 A1 | 7/2008 | Liu et al. |
| 2010/0041434 A1 | 2/2010 | Hirano |
| 2011/0151861 A1 | 6/2011 | Kim et al. |
| 2013/0077482 A1* | 3/2013 | Krishna ............... H04W 36/22 370/230 |
| 2013/0083661 A1* | 4/2013 | Gupta .................. H04W 4/005 370/235 |
| 2013/0121182 A1 | 5/2013 | Hegge |
| 2013/0137423 A1 | 5/2013 | Das et al. |
| 2014/0181515 A1 | 6/2014 | Yang |
| 2014/0329526 A1 | 11/2014 | Sundararajan et al. |
| 2015/0124791 A1* | 5/2015 | Mazandarany ..... H04W 76/021 370/338 |
| 2015/0319654 A1* | 11/2015 | Hayashi .................. H04L 12/14 370/331 |

FOREIGN PATENT DOCUMENTS

| | | |
|---|---|---|
| GB | 2457656 A | 8/2009 |
| WO | 2007036764 A1 | 4/2007 |
| WO | 2014094849 A1 | 6/2014 |
| WO | 2014112941 A1 | 7/2014 |
| WO | 2016067078 A1 | 5/2016 |

OTHER PUBLICATIONS

Katajala, J., "WCDMA Radio Access Network", Feb. 2, 2005, pp. 1-23, T-110.456, Next generation cellular networks.
Prasad, R., "WCDMA", WCDMA: Towards IP Mobility and Mobile Internet, Chapter 6, Feb. 1, 2001, retrieved on Jan. 21, 2015, retrieved from Internet: www.privateline.com/3G/WCDMA.pdf.
3rd Generation Partnership Project, "Digital cellular telecommunications system (Phase 2+); Enhanced Generic Access Networks (EGAN) study (3GPP TR 43.902 version 11.0.0 Release 11)", Technical Report, ETSI TR 143 902 V11.0.0, Oct. 1, 2012, pp. 1-136, ETSI.
Annonimous, "UTRAN Radio Interface Protocols", lecture, retrieved on Jan. 21, 2015, retrieved from internet: www.comlab. hut.fi/opetus/238/lecture7_RadioInterfaceProtcols.pdf.
eventhelix.com, Inc., "LTE X2 Handover Messaging", Jan. 1, 2013, retrieved on Jan. 21, 2015, retrieved from Internet: www.eventhelix. com/lte/handover/LTE-X2-Handover-Messaging.pdf.
Long Term Evolution (LTE), "Attach and Default Bearer Setup (Moving from Old to New MME)", Dec. 11, 2012, pp. 1-6, retrieved on Jan. 21, 2015, retrieved from internet: www.eventhelix.com/lte/ attach/lte-attach.pdf.
Freescale, "Long Term Evolution Protocol Overview", White paper, Oct. 1, 2008, pp. 1-21, Document No. LTEPTCLOVWWP, Rev. 0, retrieved on Jan. 21, 2015, retrieved from internet: http://www. freescale.com/files/wireless_comm/doc/white_paper/ LTEPTCLOVWWP.pdf., Freescale Semiconductor.
Ergen, M, "I-WLAN: Intelligent Wireless Local Area Networking", Jan. 1, 2004, pp. 1-302, retrieved on Jan. 21, 2015, retrieved from internet: wow.eecs.berkeley.edu/ergen/docs/ergen_PhD.pdf.
O'Hara, B., "802.11F Inter-AP Protocol", retrieved on Jan. 21, 2015, retrieved from internet: www.ieee802.org/21/archived_docs/ Documents/ . . . /Handoff_O'Hara.pdf.
3rd Generation Partnership Project, "Digital cellular telecommunications system (Phase 2+); Generic Access Network (GAN); Mobile GAN interface layer 3 specification (3GPP TS 44.318 version 12.0.0 Release 12)", Technical Specificaton, ETSI TS 144 318 V12.0.0, Sep. 1, 2014, pp. 1-253, ETSI.
Yoo, C., "Network Architecture for LTE and Wi-Fi Interworking", Aug. 16, 2012, pp. 1-19, NMC Consulting Group.
3rd Generation Partnership Project, "Technical Specification Group Services and System Aspects; 3GPP system to Wireless Local Area Network (WLAN) interworking; System description (Release 12)", Technical Specification, 3GPP TS 23.234 V12.0.0, Sep. 1, 2014, pp. 1-84, 3GPP, France.
3rd Generation Partnership Project, "Technical Specification Group Services and System Aspects; Architecture enhancements for non-3GPP accesses (Release 13)", Technical Specification, 3GPP TS 23.402 V13.0.0, Dec. 1, 2014, pp. 1-290, 3GPP, France.
LTE World, "LTE Handovers—Intra E-UTRAN Handover", in Blog, Posted Apr. 10, 2010, pp. 1-2, retrieved on Jan. 21, 2015, retrieved from Internet: http://lteworld.org/blog/lte-handovers-intra-e-utran-handover.
TSG RAN WG2, "S2.22 : RLC protocol specification", TSG-RAN #2, Fort Lauderdale, USA, Mar. 2, 1999, pp. 1-44, TSGR#2(99)147, 3GPP.
3rd Generation Partnership Project, "Technical Specification Group GSM/EDGE Radio Access Network; Generic Access Network (GAN); Stage 2 (Release 12)", Technical Specification, 3GPP TS 43.318 V12.0.0, Sep. 1, 2014, pp. 1-128, 3GPP, France.
3rd Generation Partnership Project, "Technical Specification Group Core Network and Terminals; Access to the 3GPP Evolved Packet Core (EPC) via non-3GPP access networks; Stage 3 (Release 13)", Technical Specification, 3GPP TS 24.302 V13.0.0, Dec. 1, 2014, pp. 1-104, 3GPP, France.
3rd Generation Partnership Project, "Technical Specification Group Services and System Aspects; Architecture enhancements for non-3GPP accesses (Release 12)", Technical Specification, 3GPP TS 23.402 V12.4.0, Mar. 1, 2014, pp. 1-288, 3GPP, France.
Balasubramanian, A. et al., "Augmenting Mobile 3G Using WiFi", MobiiSYs, Jun. 15, 2010, pp. 1-13, San Francisco, CA, US, retrieved on Jan. 23, 2015, retrieved from internet:p://research. microsoft.com/pubs/135671/mobisys2010-wiffler.pdf.
Sou, S-I, "Mobile Data Offloading With Policy and Charging Control in 3GPP Core Network", IEEE Transaction on Vehicular Technology, Sep. 1, 2013, pp. 3481-3486, vol. 62, No. 7, IEEE.
Botsman, I, et al., "Mobile Data Traffic Offloading by Means of WiFi Technology", 21ss International Crimean Conference "Microwave & Telecommunication Technology", Sep. 12, 2011, pp. 363-364, IEEE.
Thiebaut, L., "Using a Trusted WLAN Network to Offload Mobile Traffic and Leverage Deployed Broadband Network Gateways", Bell Labs Technical Journal, Jun. 1, 2012, pp. 89-104, vol. 17, Issue 1, Alcatel-Lucent.
Tomici, J. et al., "Multi-RAT Traffic Offloading Solutions for the Bandwidth Crunch Problem", 2011 IEEE Long Island Systems, Applications and Technology Conference, May 6, 2011, pp. 1-6, IEEE.

(56) References Cited

OTHER PUBLICATIONS

Chan, A. et al., "IEEE P802.21c draft specification", Oct. 3, 2012, pp. 1-128, retrieved on Jan. 23, 2015, retrieved from internet: http://www.ieee802.org/21/.
3rd Generation Partnership Project, "3rd Generation Partnership Project; Technical Specification Group Radio Access Network; UE Radio Access capabilities (Release 12)", Technical Specification, 3GPP TS 25.306 V12.4.0, Dec. 1, 2014, pp. 1-75, 3GPP, France.
Clahoun, P., "Lightweight Access Point Protocol", Independent Submission, Request for Comments: 5412, ISSN: 2070-1721, Feb. 1, 2010, pp. 1-125, IETF.
LAN MAN Standards Committee, "P802.11F Draft Recommended Practice for Multi-Vendor Access Point Interoperability via an Inter-Access Point Protocol Across Distribution Systems Supporting IEEE 802.11 Operation", Mar. 1, 2003, pp. 1-69, IEEE.

\* cited by examiner

ATTACHMENT, HANDOVER, AND TRAFFIC OFFLOADING BETWEEN 3GPP RANS AND WI-FI RANS

TECHNICAL FIELD

The present disclosure relates to interactions between 3GPP radio access networks (RANs) and Wi-Fi RANs, and more particularly to methods and apparatus for attachment, handover, and traffic offloading between such RANs.

BACKGROUND

The 3rd Generation Partnership Project (3GPP) is an organization that develops and maintains telecommunications standards for cellular communication networks, such as the Global System for Mobile Communications (GSM), Wideband Code Division Multiple Access (W-CDMA), Long Term Evolution (LTE), and more. In this application, a radio access network (RAN) portion of a 3GPP-based network is referred to as a "3GPP RAN." Thus, a 3GPP RAN could include a GSM RAN, a LTE RAN, a W-CDMA RAN, etc. The 802.11 standards for Wi-Fi RANs are maintained by a separate organization, the Institute of Electrical and Electronics Engineers (IEEE).

Mobile traffic offloading is a term used to describe the use of complementary network technologies for delivering traffic originally targeted for cellular networks. The surge of mobile data traffic resulting from the increased usage of smartphones and tablets with both 3GPP and Wi-Fi capabilities, as well as the increase demands on audio and video streaming, and the explosion in Internet data access, especially the portion going through the mobile network, has increased the need for mobile data offloading. The main complementary network technologies used for mobile traffic offloading are Wi-Fi, femtocells, and Integrated Mobile Broadcast.

Although some known techniques exist for offloading from 3GPP RANs, these solutions either do not provide seamless interworking and handover between 3GPP and Wi-Fi RANs, require additional hardware, or require burdensome device configuration changes. One example prior art technique involves the use of Access Network Discovery and Selection Function (ANSDF) (see 3GPP TS 23.402 ANDSF), whose purpose is to assist user devices to discover access networks in their vicinity and to provide rules (policies) to prioritize and manage connections to all networks.

Another prior art technique uses Generic Access Network (GAN) offloading, which is based on 3GPP GAN standards (see 3GPP TS 43.318 and 3GPP TS 44.318) that are designed to extend mobile voice, data, and IP Multimedia Subsystem/Session Initiation Protocol (IMS/SIP) applications over Internet Protocol (IP) networks using Unlicensed Mobile Access (UMA) for external IP access into the wireless core network. With GAN, dual-mode User Equipment (UE) handset subscribers are provided seamless handover connections between 3GPP wireless LANs and 802.11 Wide Area Networks. A local network is based on private unlicensed spectrum technologies like 802.11/Wi-Fi, while a wide network is cellular 3GPP based services. On the cellular network, mobile handsets communicate over the air with a base station, to servers in the core network of the carrier. Under the GAN system, when a handset detects a wireless LAN, it establishes a secure IP connection through a gateway to a server called a GAN Controller (GANC) on the carrier's network. The GANC is presented to the mobile core network as a standard cellular base station. The handset communicates with the GANC over the secure connection using existing GSM/UMTS protocols. Thus, when a mobile handset moves from a GSM to an 802.11 network, it appears to the core network as if it is simply on a different base station.

Another prior art technique uses Inter Access Point Protocol (IEEE 802.11(f) IAPP). IEEE 802.11 (f) proposes a practice for the implementation of Wireless Distribution System Services, and a protocol which allows Wi-Fi Access Points (APs) from different vendors to communicate with each other in a standardized manner and interoperate together to enable Wi-Fi based wireless devices to move between different wireless regions served by different Wi-Fi vendors' applications. This standard has been dropped, and is not being pursued by service providers.

Another prior art technique offloads traffic to femtocells. This technique makes use of standard cellular radio technologies to enable UEs to participate in the data offloading process. However, this option requires some modification to the devices to accommodate the different backhaul connection, as well as the use of unlicensed spectrum. Given that cellular radio technologies are founded on the ability to do network planning within licensed spectrum, it has been deemed to be difficult, from both a technical and business standpoint, to mass deploy femtocell access points.

Some additional techniques include indoor offloading (which makes use of standard cellular radio technologies to enable UEs to participate in the data offloading process), and Wi-Fi hotspot offloading (which can offload between Wi-Fi networks).

Each of these prior art techniques is lacking in that they do not provide seamless interworking and handover between 3GPP based RANs using licensed spectrum and 802.11 or cellular (e.g., femtocell) based RANs that use unlicensed spectrum. Also, these solutions require new hardware, or considerable modification to current network hardware and UEs.

SUMMARY

The rules that govern the triggering of the mobile offloading action can be set by either an end-user (mobile subscriber) or an operator. The control mechanism operating on these rules may reside in an end-user device, in an operator server, or is divided between the two. This disclosure proposes extensions to the 3GPP protocols standard, such as the air interface between mobile user equipment and the base-station, and the interface between base stations, to allow seamless data offloading as well as handover to facilitate mobility.

According to one aspect of the present disclosure, a method is implemented by a base station that supports a 3GPP radio access network (RAN) and has an associated Wi-Fi RAN that is either supported by the base station or is supported by an access point that is colocated with the base station. The base station receives a request from a user equipment (UE). If the request is a request for a current Wi-Fi service capability of the base station, the base station:
  determines, based on the request, whether the Wi-Fi RAN has sufficient available resources to support QoS requirements of the UE; and
  transmits a corresponding response to the UE based on the determining which indicates whether the Wi-Fi RAN has sufficient available resources to support QoS requirements of the UE.
If the response indicates that the Wi-Fi RAN has sufficient available resources to support the QoS requirements of the UE, the base station also transmits Wi-Fi credentials to the UE to enable the UE to access the Wi-Fi RAN. However, if the response indicates that the Wi-Fi RAN does not have sufficient available resources to support the QoS requirements of the UE or if the request is a request to access the 3GPP RAN, the base station attempts to enable the UE to access the 3GPP RAN and does not transmit Wi-Fi credentials to the UE for the Wi-Fi RAN.

According to another aspect of the present disclosure, a method is implemented by a source base station that supports a 3GPP RAN and has an associated Wi-Fi RAN that is either supported by the source base station or is supported by an access point that is colocated with the source base station. The source base station determines that a data session between a UE and the Wi-Fi RAN of the source base station needs to be handed over; and transmits, based on the determining, a request to a target base station that supports a 3GPP RAN to determine a current Wi-Fi service capability of the target base station. The source base station receives a response from the target base station that indicates the current Wi-Fi service capability of the target base station. The source base station transmits a handover request to the UE based on the response. The handover request includes one of:

a request that the UE handover the data session to the 3GPP RAN of the target base station; or a request that the UE handover the data session to a Wi-Fi RAN of the target base station that is either supported by the target base station or is supported by an access point that is colocated with the target base station.

According to another aspect of the present disclosure, a method is implemented by a target base station that supports a 3GPP RAN and has an associated Wi-Fi RAN that is either supported by the target base station or is supported by an access point that is colocated with the target base station. The target base station receives a request from a source base station to indicate a Wi-Fi capability of the target base station. The source base station supports a 3GPP RAN and has an associated Wi-Fi RAN that is either supported by the source base station or is supported by an access point that is colocated with the source base station. Also, the request includes QoS requirements of a UE participating in a data session with the Wi-Fi RAN of the source base station. The target base station determines, based on the request, whether the Wi-Fi RAN of the target base station has sufficient available resources to support the QoS requirements of the UE. The target base station transmits a corresponding response to the source base station that indicates that the target base station supports a Wi-Fi RAN, and that indicates, based on the determining, whether the target base station has sufficient available resources to support the QoS requirements of the UE.

According to another aspect of the present disclosure, a method is implemented by a UE that is capable of supporting a session with a 3GPP RAN and is also capable of supporting a session with a Wi-Fi RAN. The UE sends a request to a base station that supports a 3GPP RAN to determine a current Wi-Fi service capability of the base station, wherein the request is sent via the 3GPP RAN. The UE receives, via the 3GPP RAN, a corresponding response from the base station that indicates whether the base station has an associated Wi-Fi RAN that is either supported by the base station or is supported by an access point that is colocated with the base station. If the base station does have an associated Wi-Fi RAN, the response also indicates whether the Wi-Fi RAN has sufficient available resources to support QoS requirements of the UE. If the response indicates that the base station has an associated Wi-Fi RAN and that the Wi-Fi RAN has sufficient available resources to support QoS requirements of the UE, the UE subsequently receives Wi-Fi credentials for the Wi-Fi RAN over the 3GPP RAN, and attempts to establish a data session with the Wi-Fi RAN using the Wi-Fi credentials.

According to another aspect of the present disclosure, a method is implemented by a UE that is capable of supporting a session with a 3GPP RAN and is also capable of supporting a session with a Wi-Fi RAN. The UE participates in a data session with a Wi-Fi RAN that is either supported by a source base station or is supported by an access point that is colocated with the source base station, wherein the source base station also supports a 3GPP RAN. The UE receives a handover request from the source base station. The handover request includes one of the following:

a request that the UE handover the data session to a 3GPP RAN of a target base station; or a request that the UE handover the data session to a Wi-Fi RAN of the target base station that is either supported by the target base station or is supported by an access point that is colocated with the target base station.

The UE hands over the data session based on the handover request.

According to another aspect of the present disclosure, a base station is disclosed that supports a 3GPP RAN and has an associated Wi-Fi RAN that is either supported by the base station or is supported by an access point that is colocated with the base station. The base station includes one or more processing circuits configured to receive a request from a UE, and if the request is a request for a current Wi-Fi service capability of the base station, to:

determine, based on the request, whether the Wi-Fi RAN has sufficient available resources to support QoS requirements of the UE; and transmit a corresponding response to the UE based on the determining which indicates whether the Wi-Fi RAN has sufficient available resources to support QoS requirements of the UE.

If the response indicates that the Wi-Fi RAN has sufficient available resources to support the QoS requirements of the UE, the one or more processing circuits are configured to transmit Wi-Fi credentials to the UE to enable the UE to access the Wi-Fi RAN. However, if the response indicates that the Wi-Fi RAN does not have sufficient available resources to support the QoS requirements of the UE, or if the request is a request to access the 3GPP RAN, the base station attempts to enable the UE to access the 3GPP RAN and does not transmit Wi-Fi credentials to the UE for the Wi-Fi RAN.

According to another aspect of the present disclosure, a base station is disclosed that supports a 3GPP RAN and has an associated Wi-Fi RAN that is either supported by the base station or is supported by an access point that is colocated with the base station. The base station acts as a source base station with respect to a target base station. The source base station includes one or more processing circuits configured to determine that a data session between a UE and the Wi-Fi RAN of the source base station needs to be handed over. The one or more processing circuits are further configured to transmit, based on the determining, a request to the target base station that supports a 3GPP RAN to determine a current Wi-Fi service capability of the target base station. The one or more processing circuits are further configured to receive a response from the target base station that indicates the current Wi-Fi service capability of the target base station, and to transmit a handover request to the UE based on the response. The handover request includes one of:
- a request that the UE handover the data session to the 3GPP RAN of the target base station; or
- a request that the UE handover the data session to a Wi-Fi RAN of the target base station that is either supported by the target base station or is supported by an access point that is colocated with the target base station.

According to another aspect of the present disclosure, a base station is disclosed that supports a 3GPP RAN and has an associated Wi-Fi RAN that is either supported by the base station or is supported by an access point that is colocated with the base station. The base station acts as a target base station with respect to a source base station. The target base station includes one or more processing circuits configured to receive a request from a source base station to indicate a Wi-Fi capability of the target base station. The source base station supports a 3GPP RAN and has an associated Wi-Fi RAN that is either supported by the source base station or is supported by an access point that is colocated with the source base station. The received request includes QoS requirements of a UE participating in a data session with the Wi-Fi RAN of the source base station. The one or more processing circuits of the target base station are further configured to determine, based on the request, whether the Wi-Fi RAN of the target base station has sufficient available resources to support the QoS requirements of the UE. The one or more processing circuits of the target base station are further configured to transmit a corresponding response to the source base station that indicates that the target base station supports a Wi-Fi RAN, and that indicates, based on the determining, whether the target base station has sufficient available resources to support the QoS requirements of the UE.

According to another aspect of the present disclosure, a UE is disclosed that is capable of supporting a session with a 3GPP RAN and is also capable of supporting a session with a Wi-Fi RAN. The UE includes one or more processing circuits configured to send a request to a base station that supports a 3GPP RAN to determine a current Wi-Fi service capability of the base station, wherein the request is sent via the 3GPP RAN. The one or more processing circuits are further configured to receive, via the 3GPP RAN, a corresponding response from the base station that indicates whether the base station has an associated Wi-Fi RAN that is either supported by the base station or is supported by an access point that is colocated with the base station. If the base station does have an associated Wi-Fi RAN, the response also indicates whether the Wi-Fi RAN has sufficient available resources to support QoS requirements of the UE. The one or more processing circuits are further configured to, if the response indicates that the base station has an associated Wi-Fi RAN and that the Wi-Fi RAN has sufficient available resources to support QoS requirements of the UE, subsequently receive Wi-Fi credentials for the Wi-Fi RAN over the 3GPP RAN, and attempt to establish a data session with the Wi-Fi RAN using the Wi-Fi credentials.

According to another aspect of the present disclosure, a UE is disclosed that is capable of supporting a session with a 3GPP RAN and is also capable of supporting a session with a Wi-Fi RAN. The UE includes one or more processing circuits configured to participate in a data session with a Wi-Fi RAN that is either supported by a source base station or is supported by an access point that is colocated with the source base station, wherein the source base station also supports a 3GPP RAN. The one or more processing circuits are further configured to receive a handover request from the source base station, with the handover request comprising one of the following:
- a request that the UE handover the data session to a 3GPP RAN of a target base station; or
- a request that the UE handover the data session to a Wi-Fi RAN of the target base station that is either supported by the target base station or is supported by an access point that is colocated with the target base station.

The one or more processing circuits are further configured to hand over the data session based on the handover request.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Aspects of the present disclosure relate to methods and related devices that enable 3GPP wireless traffic offloading, with handover support, based on the capability of a given radio base station (RBS) and a given user equipment (UE). Techniques are described which allow a 3GPP base station to select and control the radio access technology (RAT) type (3GPP or Wi-Fi) that a UE uses for its wireless traffic, which enables seamless handover between 3GPP (cellular) and Wi-Fi radio access networks (RANs). This disclosure proposes extensions to the 3GPP protocols standard, such as the air interface between mobile UEs and base stations, and the interface between base stations, to allow seamless data offloading, UE attachment to Wi-Fi RANs, and handovers, to facilitate mobility. Various ones of the embodiments discussed below can account for QoS requirements of a given UE, to ensure that a user receives the services and the quality guaranteed by its service provider. The QoS requirements can be used as criteria for the selection of a traffic path.

A number of new signaling aspects may be added to existing 3GPP standards to implement the features discussed herein. This may include a Wi-Fi capability request that is received by a base station, which asks the base station (1) whether it has an associated Wi-Fi RAN that is either supported by the base station or is supported by an access point that is colocated with the base station, and (2) if there is an associated Wi-Fi RAN, whether the associated Wi-Fi RAN has sufficient available resources to support QoS requirements of a given UE. Such a request may be sent by a UE (e.g., in connection with the UE attaching to the base station), or may be sent by a source base station to a target base station on behalf of a UE supported by the source base station (e.g., in connection with a handover).

Another new signaling aspect that is utilized in some embodiments is a request from a base station to a UE requesting that the UE delete Wi-Fi credentials for a Wi-Fi RAN. Such a request may also request that the UE terminate a given Wi-Fi session.

Another new signaling aspect that is utilized in some embodiments is a Wi-Fi handover request which is sent from a base station to a UE, and which informs the UE of a planned handover. This request may include Wi-Fi credentials (e.g., a SSID and password) for a destination Wi-Fi RAN.

Figure 2:
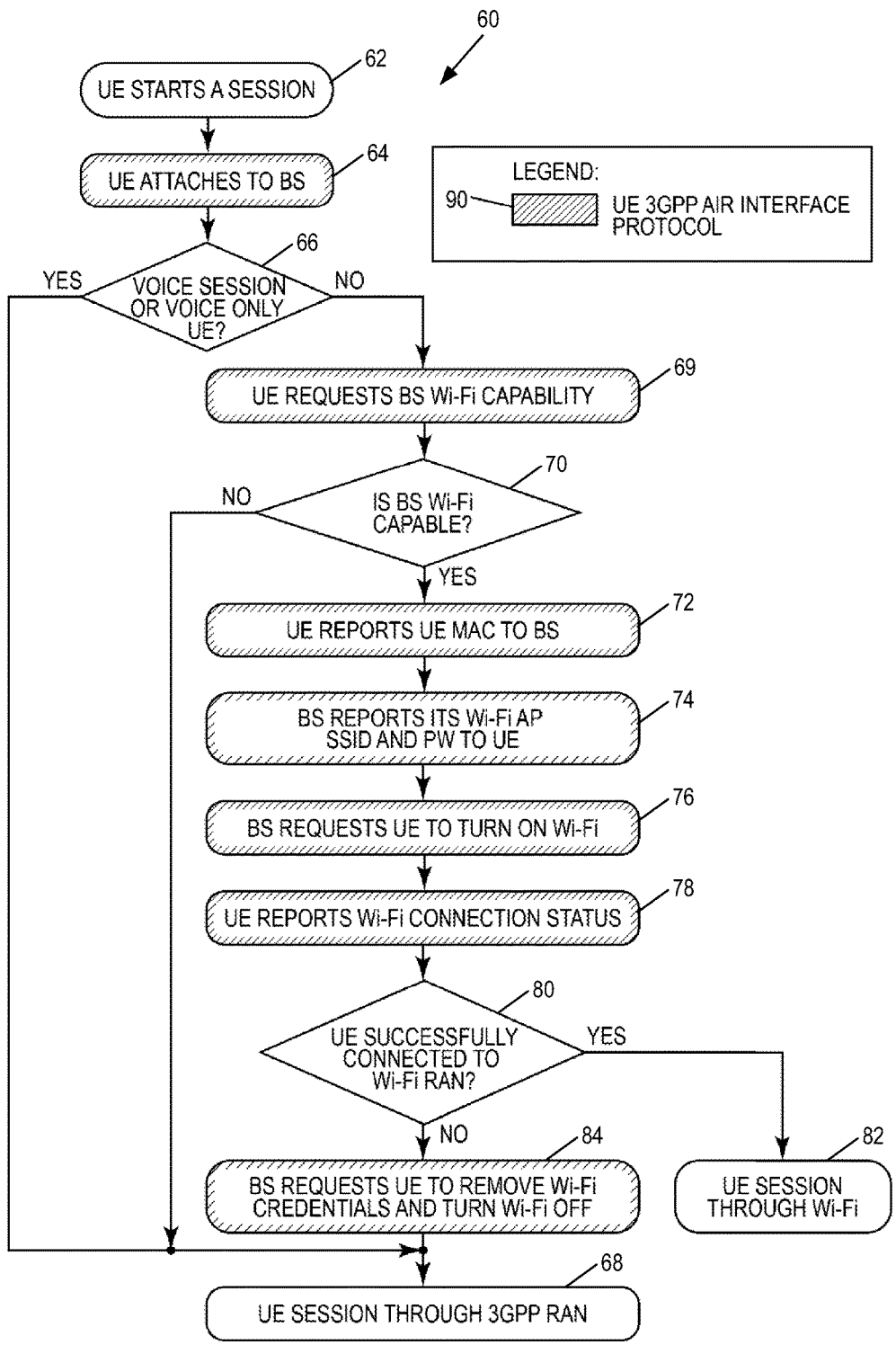
FIG. 2 is a flowchart for an example UE attachment procedure.
Figure 3:
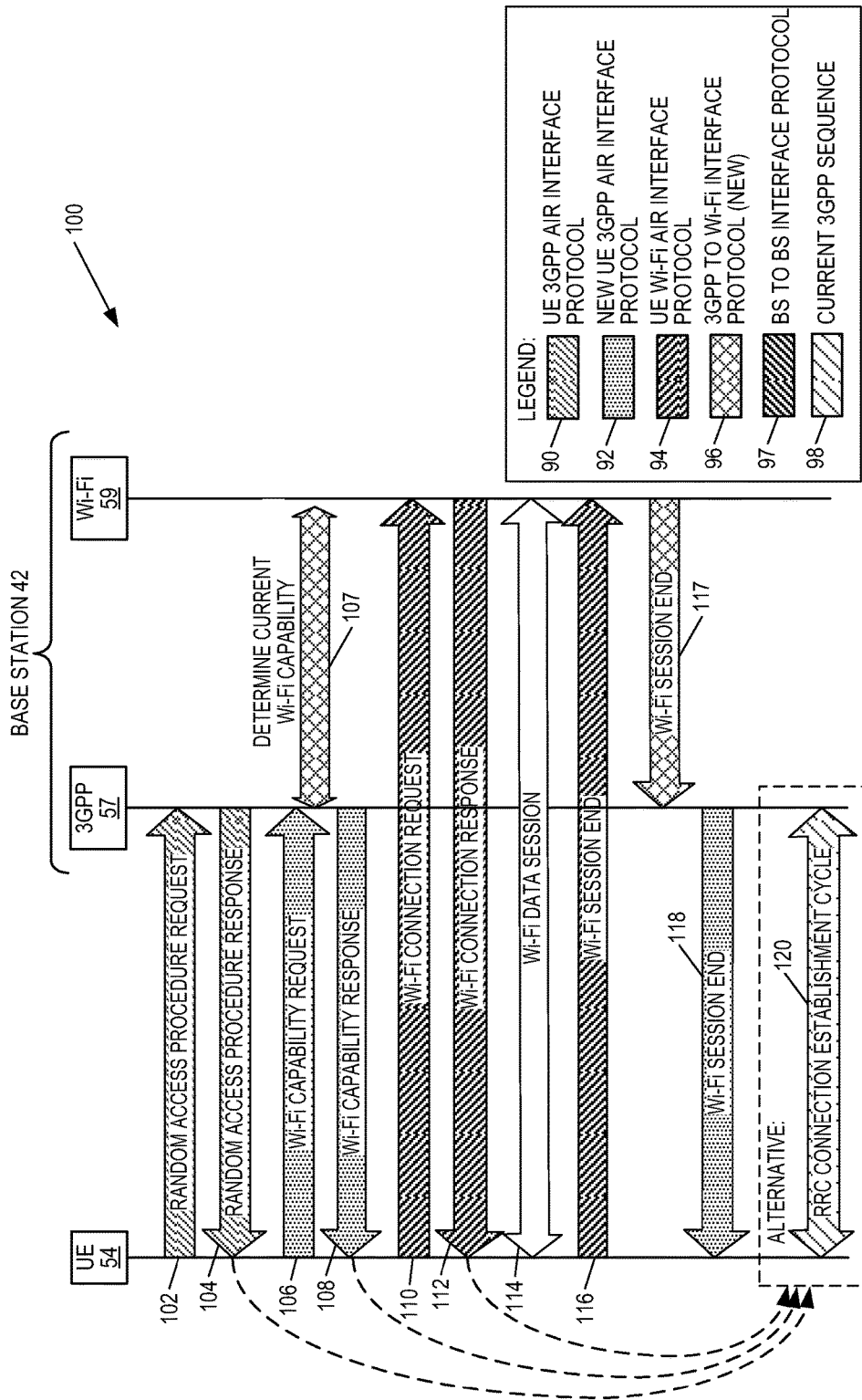
FIG. 3 is a signaling diagram illustrating a UE attachment sequence that incorporates aspects of the flowchart of FIG. 2.

In FIGS. 2-3, 6-7, and 11-13 which are discussed below in greater detail, differing shadings are used to indicate how the control signaling discussed below could be used to update existing telecommunication protocols/standards, or serve as the basis for new telecommunication protocols/ standards. An overview of all shadings is provided in the legend of FIG. 3, which shows a UE to 3GPP base station air interface protocol 90, a new UE 3GPP air interface protocol 92, a UE Wi-Fi air interface protocol 94, a new 3GPP to Wi-Fi interface protocol 96, a new 3GPP to Wi-Fi interface protocol 97, and a current 3GPP sequence 98. The "current 3GPP sequence" 98 does not necessarily indicate a single protocol, but is instead meant to reference 3GPP signaling that is known to those of ordinary skill in the art. The lack of shading for a given signal should not be construed as indicating a given protocol. For example, in FIG. 7, items 301, 322, and 328 are not shaded, but this lack of shading is not meant to indicate that they use the same protocol. The same legend applies to all of the signaling diagrams (although some figures, such as FIGS. 6A-B, include an abbreviated legend). For convenience, similar reference numerals are used throughout the figures to indicate similar elements, and similar shadings are likewise used throughout the figures (as shown in the legend of FIG. 3).

The rules that govern the triggering of the mobile offloading action can be set by either an end-user (mobile subscriber) or a network operator. The control mechanism operating on these rules may reside in an end-user device (i.e., a UE), in an operator node (e.g., a base station), or can be divided between the two.

Figure 1:
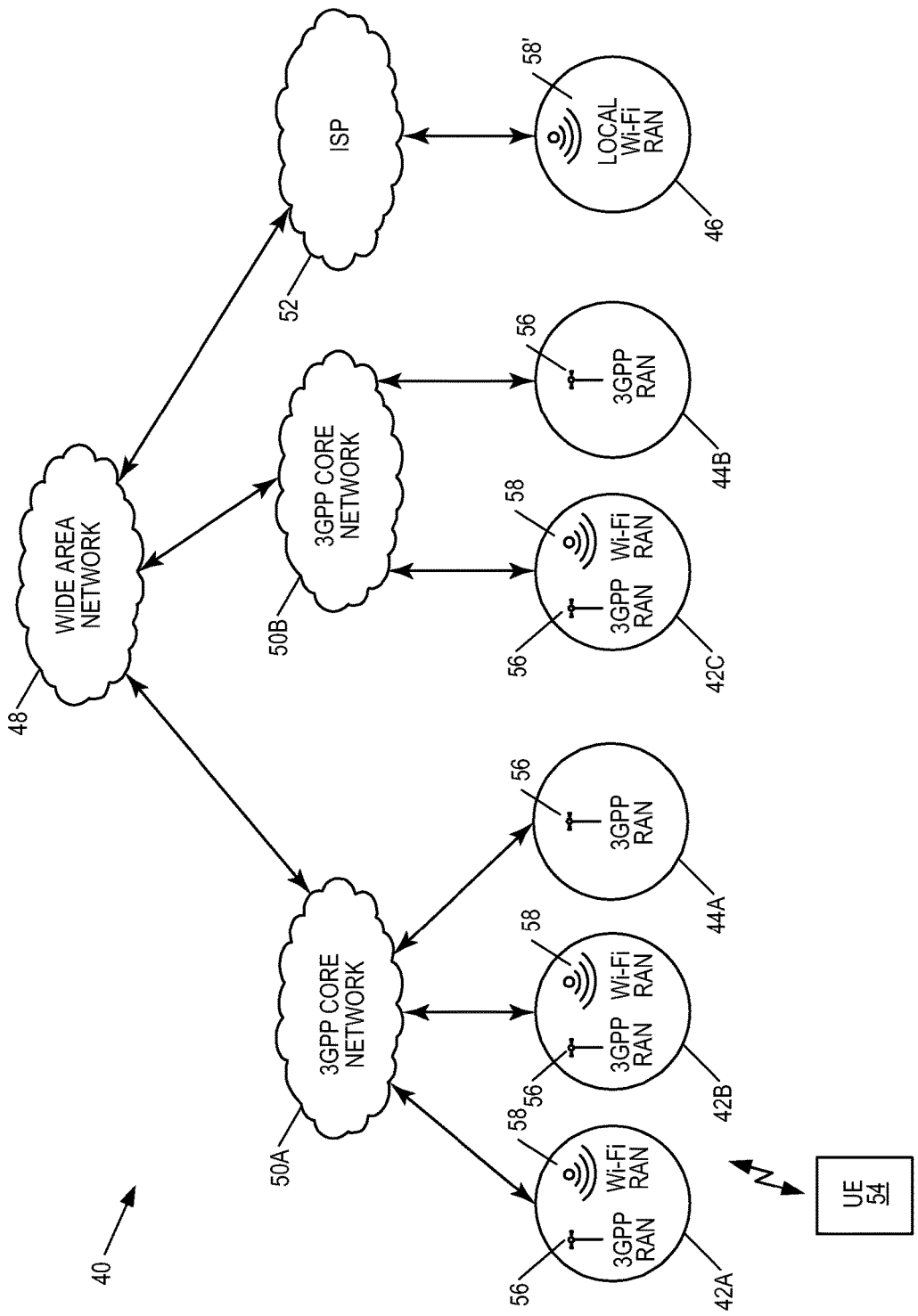
FIG. 1 illustrates a system that includes a variety 3GPP and Wi-Fi RANs.

FIG. 1 illustrates a system 40 that includes a variety 3GPP RANs 56 and Wi-Fi RANs 58 through which a UE 54 may conduct a data session. The UE 54 may be a cellular telephone, smartphone, personal digital assistant (PDA), tablet computer, laptop computer, laptop embedded equipment (LEE), laptop mounted equipment (LME), USB dongle, or any other device equipped with 3GPP and 802.11 (i.e., Wi-Fi) based wireless communication capabilities. The base stations 42, 44 may be eNodeBs (eNBs) in a LTE network, for example.

Base stations 42A-C each support 3GPP RANs 56 and have associated Wi-Fi RANs 58. Each 3GPP RAN 56 is supported by one or more 3GPP processing circuits ("3GPP processor" herein), and each Wi-Fi RAN 58 is supported by one or more Wi-Fi processing circuits ("Wi-Fi processor" herein). Each associated Wi-Fi RAN 58 is either supported by its associated base stations 42 (in which case the Wi-Fi processor is part of the base station) or is supported by an access point (AP) that is colocated with the base station 42 (in which case the Wi-Fi processor is not part of the base station, but is part of an AP).

In this regard, "colocated" means that a given base station 42 and its associated AP are associated with one another, and can perform the various signaling that shown with shading 96 in the figures discussed below (i.e., the 3GPP to Wi-Fi interface protocol). In either configuration (i.e., Wi-Fi processor part of base station 42 or colocated with base station 42), the Wi-Fi RAN 58 is accessible by the base station 42, and possibly also directly managed by the base station 42. A given 3GPP RAN 56 and its associated Wi-Fi RAN 58 have overlapping coverage areas. It is possible, but not required, that colocation connotes that the base station 42 and its colocated access point are located at a same site. In some embodiments, a given associated Wi-Fi RAN 58 may comprise multiple Wi-Fi APs (and thus multiple Wi-Fi processors) that all support the same Wi-Fi RAN, in a so-called "Wi-Fi cloud" network.

Base stations 44A-B support 3GPP RANs 56 but do not have associated Wi-Fi RANs. Each of the base stations 42, 44 is connected to a wide area network 48 (e.g., the Internet) via respective 3GPP core networks 50A-B. A secondary access point 46 provides a "local Wi-Fi" RAN 58' through an ISP 52. One example of local Wi-Fi is that provided by an ISP to a consumer's home residence (in which case the access point 46 could be a Wi-Fi router in a residential or commercial location). Another example of local Wi-Fi could include open Wi-Fi provided by a municipal government to city residents. Another example of local Wi-Fi could include a Wi-Fi hotspot that a user is registered with. The techniques discussed in this application facilitate seamless handover of the UE 54 between the various RANs shown in FIG. 1.

In a number of examples discussed below, base station 42A will be described as a "source base station" and base station 42B will be described as a "target base station." Depending on the context in which the term is used, a "source base station" is one that a UE 54 is either attempting to attach to, or that the UE is already conducting a session through, and a "target base station" is a base station that the source base station is attempting to handover a session to (e.g., based on signal strength for better service). Of course, although base stations 42A and 42B are described below as a source and target, respectively, it is understood that other base stations could be source base stations, and that other base stations could be target base stations.

With that in mind, FIG. 2 is a flowchart for an example UE attachment procedure 60. For the example discussion below, assume that UE 54 is attempting to attach to one of the base stations 42 or 44. This could be occur as a result of the UE 54 turning ON from an OFF state, or as a result of the UE 54 having an ongoing session with local Wi-Fi RAN 58' and detecting a signal degradation in the Wi-Fi RAN 58', for example. The UE 54 starts a session with the base station (block 62), and the UE attempts to attach to the base station (block 64) (e.g., according to established 3GPP session initiation procedures). If the UE is a legacy UE (e.g., a voice-only UE) or if the session is a non-Voice over IP (VoIP) voice session (a "Yes" to block 66), then the session is conducted through a 3GPP RAN of the base station (block 68). In some examples, a UE may also be considered a "legacy" UE if it has Wi-Fi support, but otherwise lacks the UE features discussed herein. Otherwise, if the session is a data session (a "No" to block 66), then the UE (which has Wi-Fi support) sends a Wi-Fi capability request to the base station (block 69) which inquires (1) whether the base station has an associated Wi-Fi RAN that is either supported by the base station or is supported by an access point that is colocated with the base station, and (2) if there is an associated Wi-Fi RAN, whether the associated Wi-Fi RAN has sufficient available resources to support QoS requirements of a given UE. The QoS requirements of the UE may be QoS requirements of a service agreement of the UE, for example.

In the example of FIG. 2, the BS is considered Wi-Fi capable if the base station has an associated Wi-Fi RAN that is either supported by the base station or is supported by an access point that is colocated with the base station, and the Wi-Fi RAN has sufficient available resources to support QoS requirements of the UE. If the BS is not Wi-Fi capable (a "No" to block 70), then the session is conducted through a 3GPP RAN of the base station (block 68). Otherwise if the BS is Wi-Fi capable (a "Yes" to block 70), then the UE reports its Media Access Control (MAC) address to the base station (block 72), and the base station responds by providing Wi-Fi credentials for its associated Wi-Fi RAN to the UE (block 74). The Wi-Fi credentials may include a Service Set Identifier (SSID) and a Wi-Fi password for the base station's associated Wi-Fi RAN, for example.

The base station also transmits a request to the UE which requests that the UE turn ON its Wi-Fi features (block 76). After the UE attempts to use the Wi-Fi credentials to connect to the Wi-Fi RAN, the UE reports its Wi-Fi connection status to the base station (block 78). If the UE is successfully able to connect to the Wi-Fi RAN (a "Yes" to block 80), then the UE session is conducted over the Wi-Fi RAN (block 82). Otherwise, if the UE is not able to successfully connect to the Wi-Fi RAN (a "No" to block 80), then the base station requests that the UE delete the Wi-Fi credentials and turn OFF its Wi-Fi features (block 84), and the session is conducted through the 3GPP RAN of the base station (block 68). The turning OFF/ON of the Wi-Fi features could correspond to the UE turning OFF/ON it's Wi-Fi radio, for example (e.g., to conserve power). As the legend in FIG. 2 suggests, blocks with the shading 90 correspond to those that may be implemented by updating a UE to 3GPP base station air interface protocol (which can be used, e.g., by UE 54 and base station 42).

FIG. 3 is a signaling diagram illustrating a UE attachment procedure 100 that incorporates aspects of the flowchart 60 of FIG. 2. In particular, FIG. 3 shows a signaling protocol sequence between the UE 54 and a base station (e.g., base station 42) using a 3GPP air interface during a UE Attachment phase. In particular, FIG. 3 illustrates a "Wi-Fi Capability Request" and corresponding "Wi-Fi Capability Response" messages (see items 106, 108), which may be used to exchange UE and base station Wi-Fi capabilities, relevant data needed by both ends, and availability of Wi-Fi Resources by the base station's associated Wi-Fi RAN. FIG. 3 also illustrates "Wi-Fi Session End" messaging (see items 116, 118) which may be used to terminate a Wi-Fi session on the UE, and cleanup the Wi-Fi credentials for the Wi-Fi RAN of the base station from the UE, and detach the UE from the base station 42.

The base station 42 in FIG. 3 includes one or more 3GPP processing circuits 57 (referred to as "3GPP processor" below) that provide a 3GPP RAN 56, and also includes one or more Wi-Fi processing circuits 59 (referred to as "Wi-Fi processor" below) that provide a Wi-Fi RAN 58. The Wi-Fi processor 59 may be part of the base station 42, or may be part of an access point that is colocated with the base station. In FIG. 3, messages 107 and 116 correspond to signaling between the 3GPP processor 57 and Wi-Fi processor 59.

As shown in FIG. 3, the UE 54 submits a random access procedure request (102) to the 3GPP processor 57 of a base station (e.g., base station 42), and receives a random access procedure response (104). Items 102, 104 correspond to item 64 of FIG. 2. Assuming the attachment succeeds, the UE transmits a Wi-Fi capability request to the 3GPP processor 57 (106), the 3GPP processor 57 determines a current Wi-Fi capability of the Wi-Fi processor 59 (107), and the UE receives a corresponding Wi-Fi capability response (108). Items 106, 108 correspond to items 69, 70 of FIG. 2.

Assuming the Wi-Fi capability response 108 indicates that the base station 42 has an associated Wi-Fi RAN and that the associated Wi-Fi RAN has sufficient available resources to support QoS requirements of the UE 54, the UE 54 sends a Wi-Fi connection request (110) to the Wi-Fi processor 59, and receives a Wi-Fi connection response (112). Assuming that a Wi-Fi connection is successfully established, the UE conducts a Wi-Fi data session with the Wi-Fi RAN 58. The UE eventually sends a Wi-Fi Session End message requesting termination of the Wi-Fi session (116). Based on this, the Wi-Fi processor 59 transmits a Wi-Fi Session End message (116) to the 3GPP processor 57, which in turn transmits a Wi-Fi session End message (118) to the UE 54. The Wi-Fi Session End message (118) is similar to block 84 of FIG. 8, in that the base station 42, through the 3GPP RAN 56, requests that the UE delete the Wi-Fi credentials for the Wi-Fi RAN 58, and detach the UE from the base station 42.

FIG. 3 also illustrates that, in the alternative, the UE 54 and 3GPP processor 57 may engage in a Radio Resource Control (RRC) Connection Establishment Cycle (120) to enable the UE to conduct its session (e.g., a data session, or voice call) over the 3GPP RAN 56. If, for example, the Wi-Fi Capability Response (108) indicates that the base station 42 does not have an associated Wi-Fi RAN, or that its associated Wi-Fi RAN lacks the resources to meet QoS requirements of the UE 54, then items 110-118 would be bypassed and the UE 54 and base station 42 would proceed to the RRC Connection Establishment Cycle (120). As another example, if the Wi-Fi Connection Response (112) indicates that a Wi-Fi session is not established between the UE 54 and Wi-Fi RAN 58, then items 114-118 would be bypassed and the UE 54 and base station 42 would proceed to the RRC Connection Establishment Cycle (120). As another example, if the attachment procedure of items 102-104 fails, then items 106-118 would be bypassed and the UE 54 and base station 42 would proceed to the RRC Connection Establishment Cycle (120).

Figure 4:
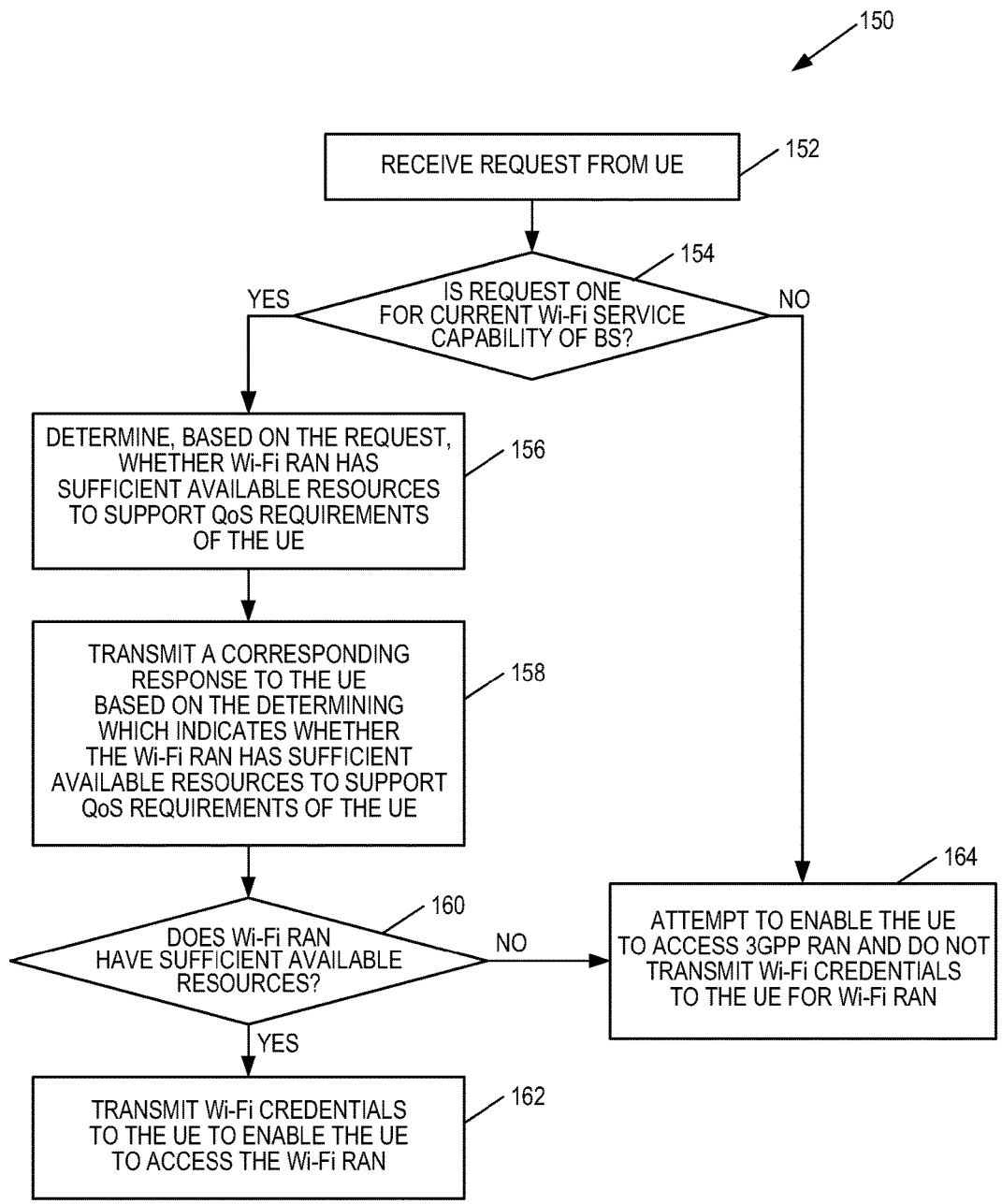
FIG. 4 is a flowchart of a method performed by a base station that incorporates aspects of FIGS. 2-3.

FIG. 4 illustrates a method 150 implemented by a base station (e.g., base station 42) that supports a 3GPP RAN 56 and has an associated Wi-Fi RAN 58 that is either supported by the base station or is supported by an access point that is colocated with the base station. The method 150 incorporates aspects of what is described in FIGS. 1-2. The base station 42 receives a request from a UE 54 (block 152). If the request is a request for a current Wi-Fi service capability of the base station (a "Yes" to block 154), then the base station determines, based on the request, whether the Wi-Fi RAN 58 has sufficient available resources to support QoS requirements of the UE (block 156). The base station also transmits a corresponding response to the UE 54 based on the determining which indicates whether the Wi-Fi RAN 58 has sufficient available resources to support QoS requirements of the UE 54 (block 158).

If the response indicates that the Wi-Fi RAN 58 has sufficient available resources to support the QoS requirements of the UE 54 (a "Yes" to block 160), then the base station also transmits Wi-Fi credentials to the UE 54 to enable the UE to access the Wi-Fi RAN (block 162). Otherwise, if the response indicates that the Wi-Fi RAN 58 does not have sufficient available resources to support the QoS requirements of the UE 54 (a "No" to block 160), or if the request of block 152 is a request to access the 3GPP RAN 56 (a "No" to block 154), then the base station 42 attempts to enable the UE 54 to access the 3GPP RAN 56, and does not transmit Wi-Fi credentials to the UE 54 for its Wi-Fi RAN (block 164).

In one or more embodiments of the method 150 of FIG. 4, if the response of block 158 indicates that the Wi-Fi RAN has sufficient available resources to support the QoS requirements of the UE, the base station 42 also transmits a request to the UE 54 which requests that the UE 54 enable its Wi-Fi features.

In one or more embodiments of the method 150 of FIG. 4, if the UE 54 is unable to establish a data session with the Wi-Fi RAN 58 using the Wi-Fi credentials, the base station 42 transmits a request to the UE 54 which requests that the UE delete the Wi-Fi credentials without establishing a data session with the Wi-Fi RAN 58, and attempts to enable the UE to access the 3GPP RAN 56 (see blocks 84, 68 of FIG. 2). In such embodiments, if the UE 54 is able to establish a data session with the Wi-Fi RAN 56 using the Wi-Fi credentials, the base station 42 may also transmit a request to the UE 54 which requests that the UE 54 delete the Wi-Fi credentials once the data session is terminated or handed over. Such requests can be used to prevent the UE from retaining Wi-Fi credentials for the Wi-Fi RAN 58 of the base station once an established Wi-Fi session is ended (or if a Wi-Fi session is attempted with the Wi-Fi credentials but is never established).

In one or more embodiments of the method 150 of FIG. 4, if the UE 54 is not able to establish a data session with the Wi-Fi RAN 58 using the Wi-Fi credentials, the base station 42 transmits a request to the UE 54 requesting that the UE 54 disable its Wi-Fi features (see also block 84 of FIG. 2).

Figure 5:
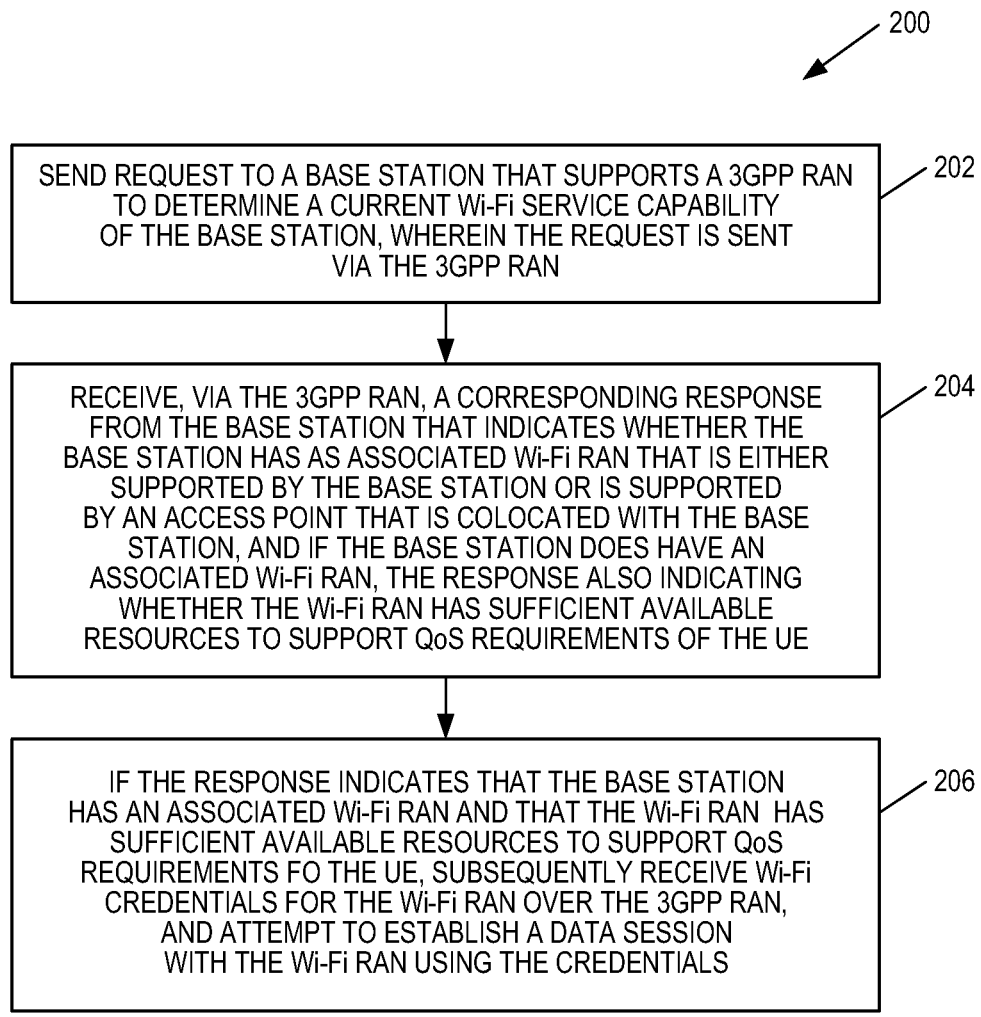
FIG. 5 is a flowchart of a method performed by a UE that incorporates aspects of FIGS. 2-3.

FIG. 5 is a flowchart of a method 200 performed by a UE 54 that incorporates aspects of FIGS. 2-3. The UE 54 is capable of supporting a session with a 3GPP RAN 56 and is also capable of supporting a session with a Wi-Fi RAN 58. The UE 54 sends a request to a base station (e.g., base station 42 or 44) which supports a 3GPP RAN 56 to determine a current Wi-Fi service capability of the base station (block 202). The request of block 202 is sent via the 3GPP RAN 56. The UE 54 receives, via the 3GPP RAN 56, a corresponding response from the base station that indicates whether the base station has an associated Wi-Fi RAN 58 that is either supported by the base station or is supported by an access point that is colocated with the base station (block 204).

If the base station does have an associated Wi-Fi RAN 58, the response also indicates whether the Wi-Fi RAN 58 has sufficient available resources to support QoS requirements of the UE 54. If the response indicates that the base station has an associated Wi-Fi RAN 58 and that the Wi-Fi RAN 58 has sufficient available resources to support QoS requirements of the UE 54, the UE 54 subsequently receives Wi-Fi credentials for the Wi-Fi RAN 58 over the 3GPP RAN 56, and attempts to establish a data session with the Wi-Fi RAN 58 using the Wi-Fi credentials (block 206). In one or more embodiments of the method 200, the UE 54 deletes the Wi-Fi credentials based on receiving, via the 3GPP RAN 56, a request from the base station requesting that the UE 54 delete the Wi-Fi credentials.

Figure 6A:
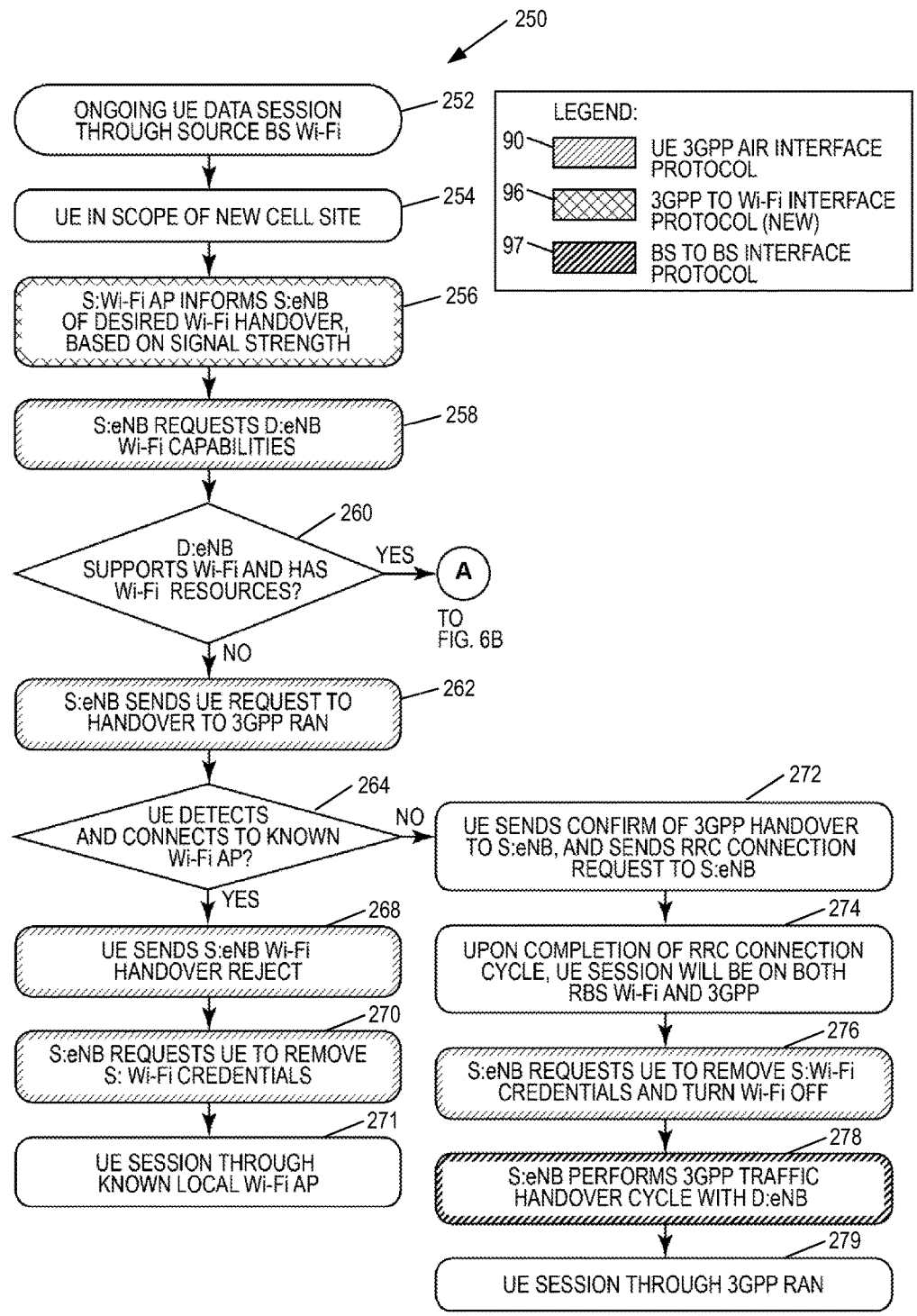
FIGS. 6A-B illustrate a flowchart for an example handover procedure.
Figure 6B:
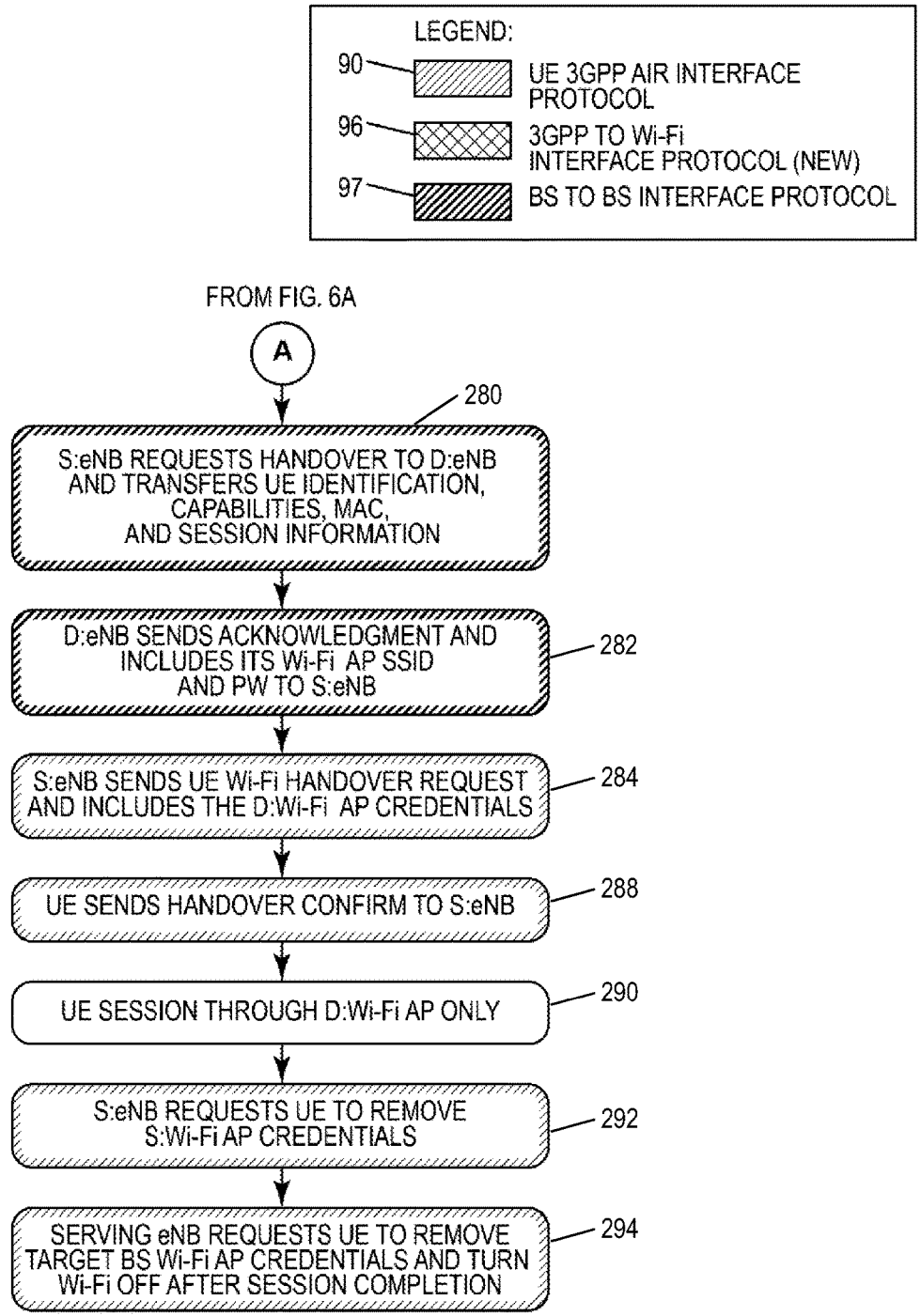

FIGS. 6A-B illustrate a flowchart for an example handover procedure 250. In FIGS. 6A-B, the notation "S:eNB" refers to the 3GPP processor 57 that is part of a given base station, "D:eNB" refers to the 3GPP processor 57 that is part of a target (i.e., destination) base station, and "S:Wi-Fi AP" refers to the Wi-Fi processor 59 that is either part of, or is colocated with a base station. Although "eNB" commonly refers to LTE base stations, it is understood that FIGS. 6A-B are not limited to LTE networks.

In FIG. 6A, UE 54 has an ongoing data session with a 58 Wi-Fi RAN associated with a source base station (i.e., supported by the source base station or supported by an access point that is colocated with the source base station) (block 252). For the example discussion below, assume that this is base station 42A. The UE 54 changes its location and moves in scope of another cell site, forcing traffic handover due to signal deterioration detected by the source base station 42A (or its colocated access point) (block 254). As a result, the base station 42A detects the need for handover, either itself or from its colocated access point (block 256). The base station 42A requests a Wi-Fi capacity of the Wi-Fi RAN 58 associated with a target base station (e.g., base station 42B) (block 258). In this regard "associated with" means that the Wi-Fi RAN 58 is supported by the target base station or is supported by an access point colocated with the target base station. Similar to the Wi-Fi capability request 106 of FIG. 3, the Wi-Fi capability request of block 258 asks the target base station (1) whether it has an associated Wi-Fi RAN that is either supported by the target base station or is supported by an access point that is colocated with the target base station, and (2) if there is an associated Wi-Fi RAN, whether the associated Wi-Fi RAN has sufficient available resources to support QoS requirements of the UE 54.

If the target base station either does not have an associated Wi-Fi RAN or has an associated Wi-Fi RAN which lacks sufficient available resources to meet QoS requirements of the UE 54 (a "No" to block 260), the base station 42A sends the UE 54 a request to handover to a 3GPP RAN of the target base station (block 262). If the UE is able to detect and connect to a known additional Wi-Fi access point (e.g., access point 46 in FIG. 1) (a "Yes" to block 264), then the UE 54 rejects the request from the base station 42A to handover to the 3GPP RAN (block 268). The base station 42A requests that the UE 54 delete the Wi-Fi credentials for its Wi-Fi RAN 42 (block 270). Thus the UE's data session can continue on the additional, local Wi-Fi RAN 58' of a known access point (e.g., access point 46), and can be discontinued on the Wi-Fi RAN 58 of the base station 42A (block 271).

However, if the UE 54 is not able to detect and connect to a known additional Wi-Fi access point (a "No" to block 264), then the UE 54 accepts the handover request of block 262 by sending a confirmation signal to the source base station 42 (block 272), and the UE 54 triggers an RRC connection establishment cycle which enables completion of a 3GPP cellular attachment (block 274). Upon completion of the RRC connection cycle, the source base station 42A requests that the UE 54 delete the Wi-Fi credentials for its Wi-Fi RAN 42, and requests that the UE disable its Wi-Fi features (block 276). The source base station 42A then performs a 3GPP traffic handover to the target base station (block 278), and the UE conducts its session through the 3GPP RAN 56.

Referring again to block 260, if the target base station does have an associated Wi-Fi RAN that has sufficient available resources to meet QoS requirements of the UE 54 (a "Yes" to block 260), then the source base station 42 transmits a request to the target base station (e.g., base station 42C) which indicates a Wi-Fi capability of the UE, a MAC address of the UE 54, and a current session type (in this example Wi-Fi) (block 280). The target base station acknowledges the request of block 280, and provides the source base station 42A with Wi-Fi credentials for the Wi-Fi RAN associated with the target base station (e.g., a SSID and password) (block 282). The source base station 42A sends a handover command to the UE 54 that includes the Wi-Fi credentials to enable the UE 54 to connect to the Wi-Fi RAN of the target base station (block 284).

Having connected to the Wi-Fi RAN of the target base station, and the UE 54 sends a confirmation message to the source base station 42A to indicate the successful Wi-Fi connection to the Wi-Fi RAN of the target base station (block 288). Once those Wi-Fi credentials are deleted, the UE is connected to the Wi-Fi RAN of the target base station and is no longer connected to the Wi-Fi RAN of the source base station 42A (block 290). The source base station 42A requests that the UE 54 delete the Wi-Fi credentials for its associated Wi-Fi RAN 42 (block 292). The source base station transmits a request to the UE 54 requesting that once the UE is no longer connected to the Wi-Fi RAN of the target base station that the UE delete the Wi-Fi credentials of Wi-Fi RAN of the target base station and (if the Wi-Fi session has not been handed off to yet another Wi-Fi RAN) that the UE disable its Wi-Fi features (block 294).

Figure 7:
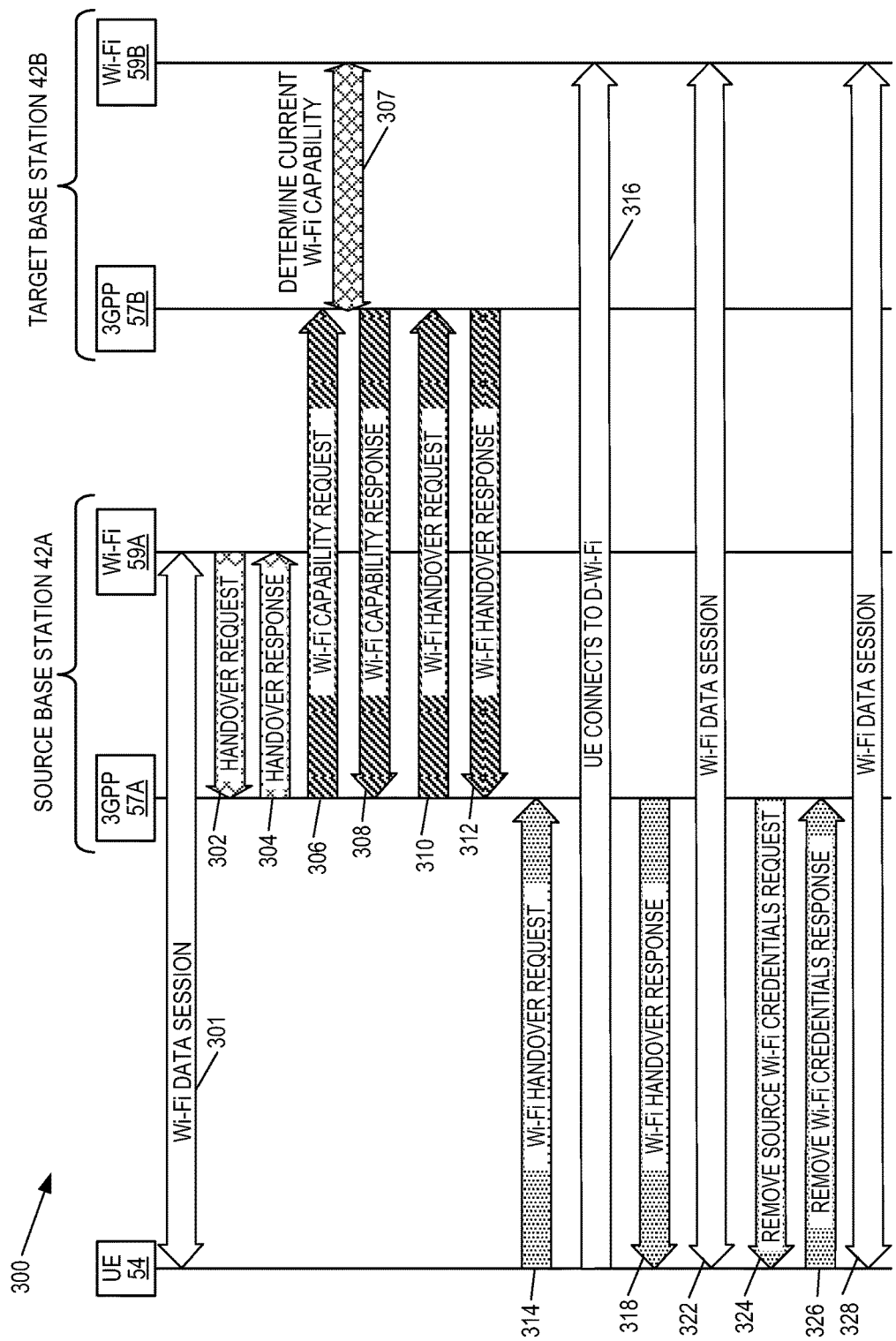
FIG. 7 is a signaling diagram for a Wi-Fi RAN to Wi-Fi RAN handover sequence that incorporates aspects of at least one of FIGS. 6A and 6B.

FIG. 7 is a signaling diagram for a Wi-Fi RAN to Wi-Fi RAN handover sequence 300 that incorporates aspects of the flowchart 250 of at least one of FIGS. 6A and 6B. In particular, FIG. 7 shows a signaling protocol sequence between the UE 54 and a base station (e.g., base station 42A) using a 3GPP air interface during a UE Attachment phase. As with the other signaling diagrams above, the various shadings in FIG. 7 identify potential telecommunication standards which could be updated based on a given message. In particular, FIG. 7 illustrates the following messaging that could serve as modifications for existing 3GPP air interface protocols:

"Wi-Fi Handover Request" (see item 314)—This signal informs the UE of a planned Wi-Fi handover, and may also provide the UE with Wi-Fi credentials for a Wi-Fi RAN associated with a target base station.

"Remove Source Wi-Fi Credentials" (see item 324)— This signal instructs a UE to end an original Wi-Fi session with a Wi-Fi RAN associated with the source base station, and to delete Wi-Fi credentials for that Wi-Fi RAN.

Additionally, the following messaging could serve as modifications for existing 3GPP X2 handover interface protocols:

"Wi-Fi Capability Request" (see item 306)—This signal is used to obtain a Wi-Fi service capability of a target base station (i.e., whether the target base station has an associated Wi-Fi RAN that is either supported by the target base station or is supported by an access point that is colocated with the target base station; and whether sufficient Wi-Fi resources are available on such a Wi-Fi RAN to support QoS requirements of a UE.

"Wi-Fi Handover request" (see item 314)—This signal is used to inform the target base station of a need to perform a Wi-Fi handover, as opposed to a cellular handover request between 3GPP RANs which is known in current 3GPP standards. In response, the target base station may provide a Wi-Fi credentials for its associated Wi-Fi RAN for use by the UE (see item 312).

Alternatively, the "Wi-Fi Capability Request" and "Wi-Fi Handover Request" could be combined into one single signal.

Referring now to FIG. 7, the UE 54 has an ongoing Wi-Fi data session with the Wi-Fi RAN of the source base station 42A (301). The Wi-Fi processor 59A of the source base station 42A, based on a trigger event, sends a handover request (302) to the 3GPP processor 57A. The 3GPP processor 57A of source base station 42A acknowledges the need for the handover in a handover response (304) to the Wi-Fi processor 59A. Item 302 in FIG. 7 corresponds to block 256 of FIG. 6A. As discussed above, the Wi-Fi processor 59 for a given base station 42 may be part of the base station 42, or may be part of an access point that is colocated with the base station 42.

The 3GPP processor 57A transmits a Wi-Fi Capability Request to target base station 42B (306). The 3GPP processor 57B of target base station 42B determines a current Wi-Fi capability of its associated Wi-Fi processor 59B (307). The 3GPP processor 57B then transmits a corresponding Wi-Fi Capability Response (308) that indicates whether the target base station 42B has an associated Wi-Fi RAN, and if so whether that associated Wi-Fi RAN has sufficient available resources to support QoS requirements of the UE 54. Item 306 of FIG. 7 corresponds to block 258 of FIG. 6A.

Assuming the target base station 42B does have an associated Wi-Fi RAN that has sufficient available resources to meet QoS requirements of the UE 54, the 3GPP processor 57A transmits a request to the target base station 42B which indicates a Wi-Fi capability of the UE, a MAC address of the UE, and a current session type (in this example Wi-Fi) (310), and in response receives Wi-Fi credentials for the Wi-Fi RAN supported by the Wi-Fi processor 59B. Items 310, 312 of FIG. 7 correspond to blocks 280, 282 of FIG. 6B.

The 3GPP processor 57A transmits a Wi-Fi handover request (314) to the UE 54 that includes the Wi-Fi credentials to enable the UE 54 to connect to the Wi-Fi RAN of the target base station. The UE attempts to connect to the Wi-Fi RAN of the target base station 42B using the credentials (316), and then transmits a corresponding Wi-Fi handover response (318) indicating whether that attempt was successful. Items 314, 318 of FIG. 7 correspond to blocks 284, 288 of FIG. 6B.

The 3GPP processor 57A transmits a request to the UE (324) to remove the Wi-Fi credentials for the Wi-Fi RAN associated with the source base station 42A (i.e., the one supported by Wi-Fi circuitry 59A), and receives confirmation (326) that the Wi-Fi credentials have been removed and that the Wi-Fi session of 301 has been terminated. The UE then continues conducting its Wi-Fi data session with the Wi-Fi RAN associated with the target base station 42B (328). Items 324, 326, 328 of FIG. 13 correspond to blocks 290, 294, 292, respectively of FIG. 12.

Figure 8:
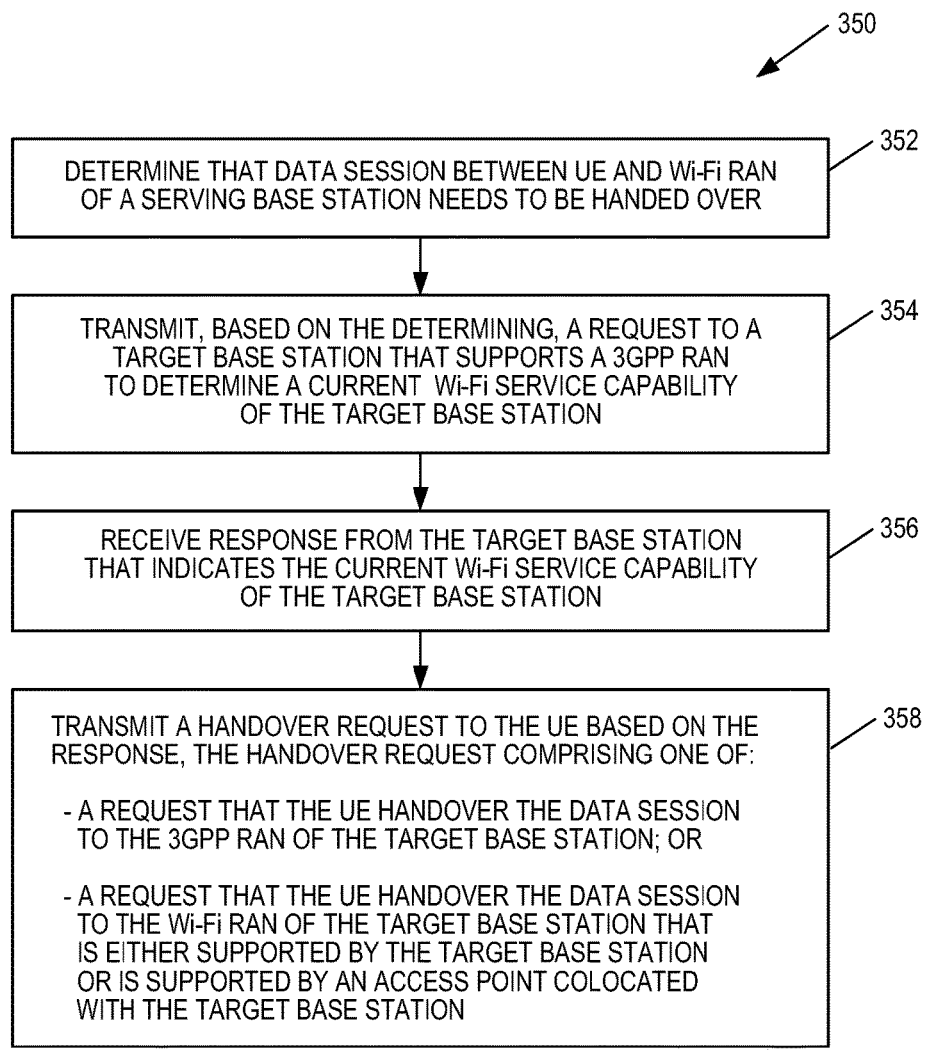
FIG. 8 is a flowchart illustrating an example method performed by a source base station that incorporates aspects of at least one of FIGS. 6A, 6B, and 7.

FIG. 8 is a flowchart illustrating an example method 350 performed by a source base station 42 that incorporates aspects of FIGS. 6-7. The base station supports a 3GPP RAN 56 and has an associated Wi-Fi RAN 58 that is either supported by the source base station 42 or is supported by an access point that is colocated with the source base station 42. For the example discussion below, assume that the source base station is base station 42A and that base station 42B is a target base station.

The base station 42A determines that a data session between a UE 54 and the Wi-Fi RAN 58 of the source base station 42A needs to be handed over (block 352). The source base station 42A transmits, based on the determining, a request to target base station (e.g., base station 42B) which that supports a 3GPP RAN 56 to determine a current Wi-Fi service capability of the target base station 42B (block 354). The source base station 42A receives a response from the target base station 42B that indicates the current Wi-Fi service capability of the target base station 42B (block 356). The source base station 42A then transmits a handover request to the UE 54 based on the response (block 358). The handover request includes one of:

a request that the UE handover the data session to the 3GPP RAN of the target base station; or a request that the UE handover the data session to a Wi-Fi RAN of the target base station that is either supported by the target base station or is supported by an access point that is colocated with the target base station.

In one or more embodiments of the method 350, the request to determine a current Wi-Fi service capability of the target base station 42B includes QoS requirements of the UE 54, and transmitting the request that the UE handover the data session to the Wi-Fi RAN of the target base station (block 358) is conditioned upon the response of block 356 indicating that the target base station 42B has an associated Wi-Fi RAN, and that the Wi-Fi RAN of the target base station 42B has sufficient available resources to support QoS requirements of the UE 54.

In one or more embodiments of the method 350, the source base station 42A receives, from the target base station 42B, Wi-Fi credentials for the Wi-Fi RAN of the target base station 42B; and transmits the Wi-Fi credentials for the Wi-Fi RAN of the target base station 42B to the UE 54 as part of the handover request of block 358.

In one or more embodiments of the method 350, the source base station 42A transmits a request to the UE 54 requesting that the UE 54 delete the Wi-Fi credentials after the UE establishes a Wi-Fi session with the Wi-Fi RAN of the target base station 42B using the Wi-Fi credentials and subsequently disconnects from the Wi-Fi RAN of the target base station 42B.

In one or more embodiments of the method 350, the source base station 42A transmits an additional handover request to the target base station 42B requesting Wi-Fi credentials for the Wi-Fi RAN of the target base station 42B, and receives a corresponding handover response from the target base station 42B that includes the Wi-Fi credentials for the Wi-Fi RAN of the target base station 42B.

In one or more embodiments of the method 350, the handover request of block 358 includes a request that the UE 54 handover its data session to the 3GPP RAN of the target base station 42B, and the method 350 further includes receiving a handover response from the UE 54 indicating whether the UE 54 accepts or rejects the handover request. In such embodiments, if the handover response from the UE 54 indicates that the UE 54 accepts the handover request, the source base station 42A transmits a request to the UE 54 requesting that the UE 54 disable its Wi-Fi features.

In one or more embodiments of the method 350, subsequent to the transmitting of the handover request to the UE (block 358), the source base station 42A transmits a request to the UE 54 requesting that the UE 54 delete Wi-Fi credentials for the Wi-Fi RAN 58 of the source base station 42A.

Figure 9:
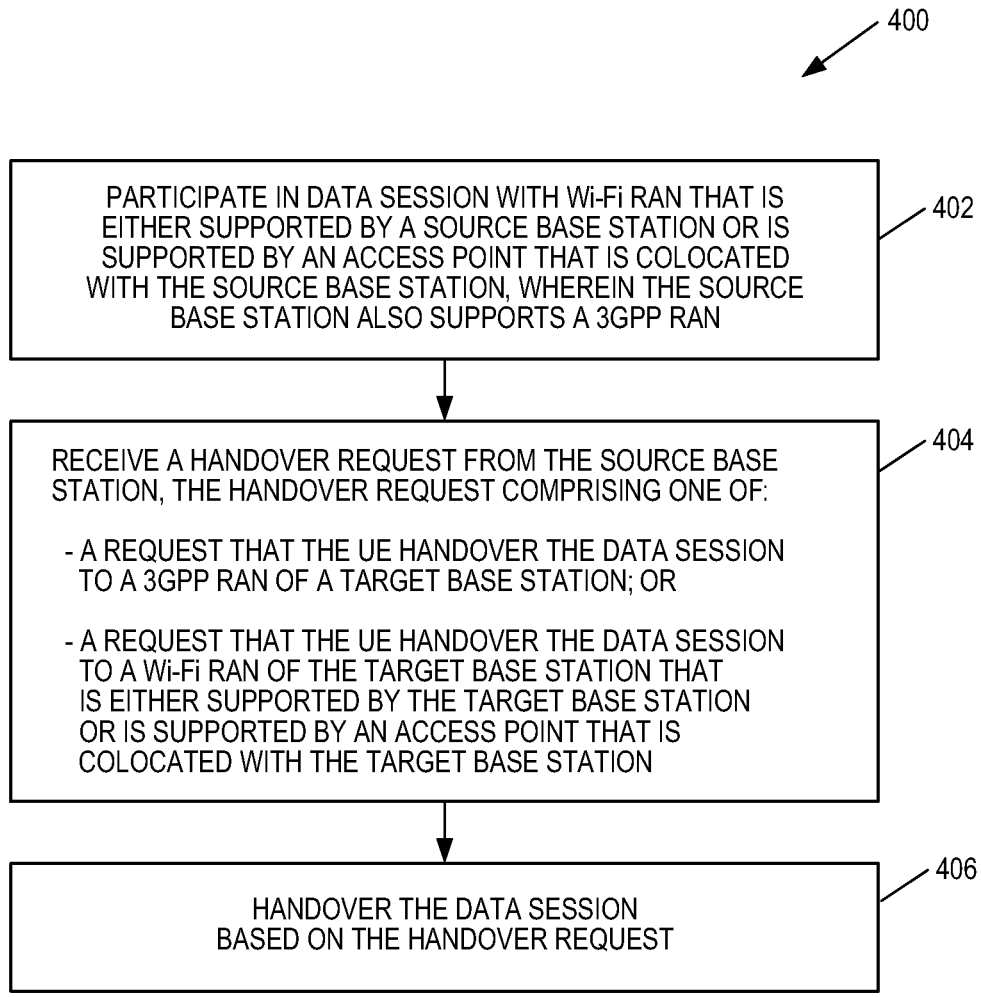
FIG. 9 is a flowchart illustrating an example method performed by a UE that incorporates aspects of at least one of FIGS. 6A, 6B, and 7.

FIG. 9 is a flowchart illustrating an example method 400 performed by a UE 54 that incorporates aspects of FIGS. 6-7. The UE 54 is capable of supporting a session with a 3GPP RAN 56 and is also capable of supporting a session with a Wi-Fi RAN 58. According to the method, the UE 54 participates in a data session with a Wi-Fi RAN 58 that is either supported by a source base station (e.g., base station 42A) or is supported by an access point that is colocated with the source base station 42A, wherein the source base station also supports a 3GPP RAN 56 (block 402). The UE 54 receives a handover request from the source base station 42A (block 404), with the handover request including one of the following:

a request that the UE 54 handover the data session to a 3GPP RAN 56 of a target base station (e.g., base station 42B); or a request that the UE 54 handover the data session to a Wi-Fi RAN 58 of the target base station 42B that is either supported by the target base station 42B or is supported by an access point that is colocated with the target base station 42B.

The UE 54 hands over the data session (block 406) based on the handover request of block 404.

In one or more embodiments of the method 400, if the handover request of block 404 comprises the request that the UE 54 handover the data session to the Wi-Fi RAN 58 of the target base station 42B, the handover request includes Wi-Fi credentials for the Wi-Fi RAN 58 of the target base station 42B (e.g., a SSID and password), and handing over the data session (block 406) comprises handing over the data session to the Wi-Fi RAN 58 of the target base station 42B.

In one or more embodiments of the method 400, if the handover request of block 404 comprises the request that the UE 54 handover the data session to the 3GPP RAN 56 of the target base station 42B, handing over the data session (block 406) includes:

handing over the data session to a Wi-Fi RAN 58' of a secondary Wi-Fi access point (e.g., access point 46) that is not the target base station and is not colocated with the source base station 42A or the target base station 42B if the UE 54 can, at its current location, connect to the secondary Wi-Fi access point 46; and handing over the data session to the 3GPP RAN 56 of the target base station 42B if the UE 54 cannot, at its current location, connect to a secondary Wi-Fi access point that is not the source base station 42A or the target base station 42B.

The UE 54 will be considered to be able to connect to the secondary Wi-Fi access point 46 if the UE 54 either has stored credentials for the Wi-Fi RAN 58 of the secondary access point 46, or if the Wi-Fi RAN 58 of the secondary access point 46 is open and does not require login credentials. If the UE hands over the data session to the Wi-Fi RAN 58' of a secondary Wi-Fi access point, then the UE will reject the request that the UE 54 handover the data session to 3GPP RAN 56 of a target base station.

In one or more embodiments of the method 400, the UE 54 receives a request from the source base station 42A to delete Wi-Fi credentials for the Wi-Fi RAN 58 of the source base station 42A, with the received request being based on the data session with the Wi-Fi RAN of the source base station being terminated or handed away from the source base station. The UE 54 then deletes the Wi-Fi credentials for the Wi-Fi RAN 58 of the source base station 42A based on the request to delete the Wi-Fi credentials.

Figure 10:
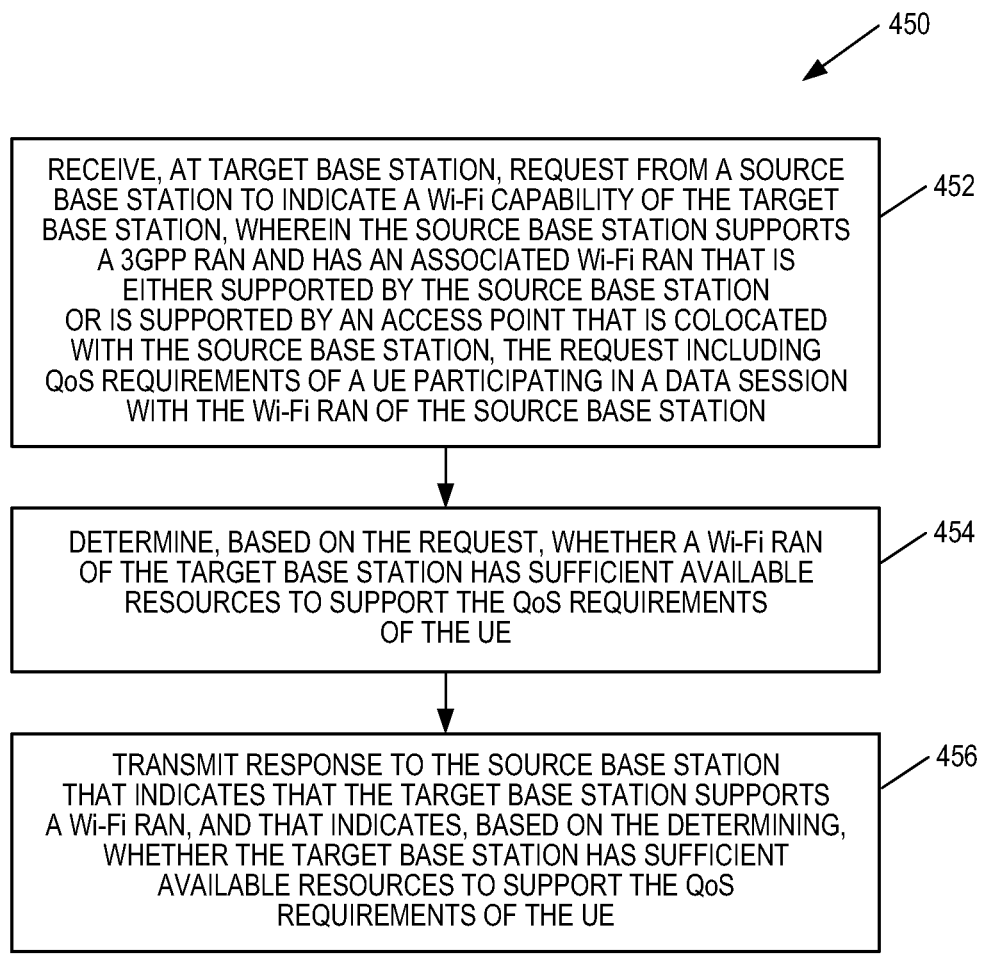
FIG. 10 is a flowchart illustrating an example method performed by a target base station that incorporates aspects of at least one of FIGS. 6A, 6B, and 7.

FIG. 10 is a flowchart illustrating an example method 450 performed by a target base station (e.g., base station 42B) that incorporates aspects of FIGS. 6-7. The target base station 42B supports a 3GPP RAN 56 and has an associated Wi-Fi RAN 58 that is either supported by the target base station 42B or is supported by an access point that is colocated with the target base station 42B. The target base station receives a request from a source base station (e.g., base station 42A) to indicate a Wi-Fi capability of the target base station 42B (block 452). The source base station 42A supports a 3GPP RAN 56 and has an associated Wi-Fi RAN 58 that is either supported by the source base station 42A or is supported by an access point that is colocated with the source base station 42A. Also, the request of block 452 includes QoS requirements of a UE 54 participating in a data session with the Wi-Fi RAN 58 of the source base station 42A. Based on the request, the target base station 42B determines whether the Wi-Fi RAN 58 of the target base station 42B has sufficient available resources to support the QoS requirements of the UE 54 (block 452). The target base station 42B transmits a corresponding response to the source base station 42A that indicates that the target base station 42B supports a Wi-Fi RAN 58, and that indicates, based on the determining, whether the target base station 42B has sufficient available resources to support the QoS requirements of the UE 54 (block 456).

In one or more embodiments of the method 18, the target base station 42B transmits Wi-Fi credentials for the Wi-Fi RAN 58 of the target base station 42B to the source base station 42A if the determining of block 454 indicates that the Wi-Fi RAN 58 of the target base station 42B has sufficient available resources to support the QoS requirements of the UE 54.

Figure 11:
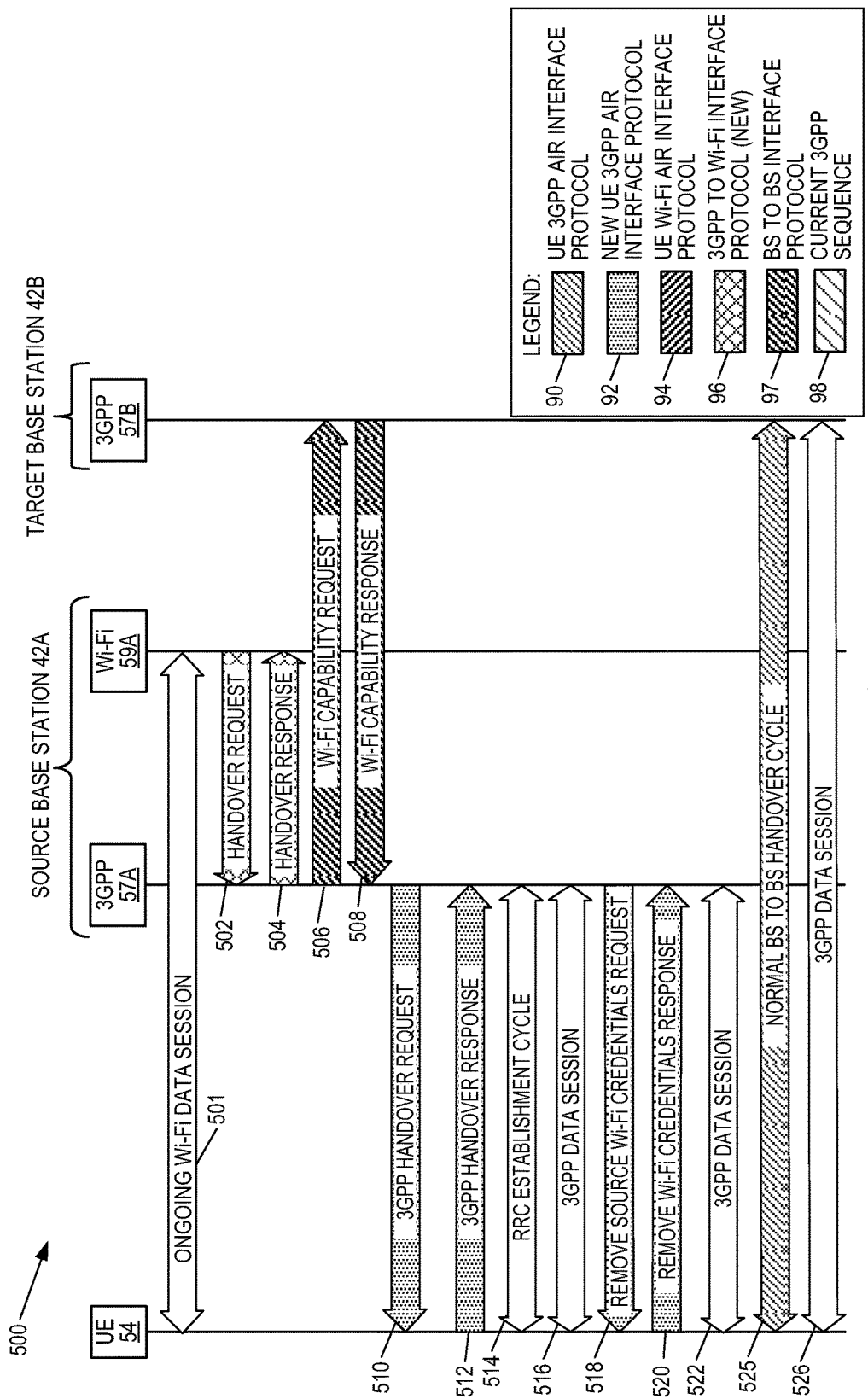
FIG. 11 is a signaling diagram illustrating a Wi-Fi RAN to 3GPP RAN handover sequence that incorporates aspects at least one of FIGS. 6A and 6B.

FIG. 11 is a signaling diagram 500 illustrating a non-local Wi-Fi RAN to 3GPP RAN handover sequence that incorporates aspects of at least one of FIGS. 6A and 6B (e.g., from Wi-Fi RAN 58 to 3GPP RAN 56). The "non-local Wi-Fi" RAN is not a local, open, or secondary Wi-Fi RAN (e.g., Wi-Fi RAN 58' in FIG. 1). Items 501-506 in FIG. 11 are the same as items 301-306 in FIG. 7. However, in FIG. 11 a point of difference is that the target base station 42B reports, in its "Wi-Fi Capability Response" (508), that it either does not have an associated Wi-Fi RAN, or that it has such an associated Wi-Fi RAN but the Wi-Fi RAN lacks sufficient available resources to support QoS requirements of UE 54.

Upon learning that the target base station 42B either lacks an associated Wi-Fi RAN or has an associated Wi-Fi RAN that lacks sufficient available resources to support QoS requirements of the UE 54, the 3GPP processor 57A transmits a 3GPP handover request (510) to the UE 54, and receives a response (512) from the UE 54 that accepts the request. Items 510, 512 correspond to blocks 262, 272 of FIG. 6A. The UE 54 and source 3GPP processor 57A then engage in a RRC establishment cycle (514), and a 3GPP data session is established (516). Items 514, 516 correspond to block 274 of FIG. 6A. The base station 42A requests that the UE remove the Wi-Fi credentials for its Wi-Fi RAN 58 (518), and the UE 54 responds indicating that the Wi-Fi credentials have been removed (520). The Wi-Fi data session of item 501 is then continued as a 3GPP data session (522). A standard 3GPP base station to base station handover cycle then occurs (524), and the data session is conducted between the UE 54 and target base station 42A (526). The details of item 524 are described in relevant 3GPP standards and are well known to those of ordinary skill in the art, and therefore will not be described in detail herein.

Figure 12:
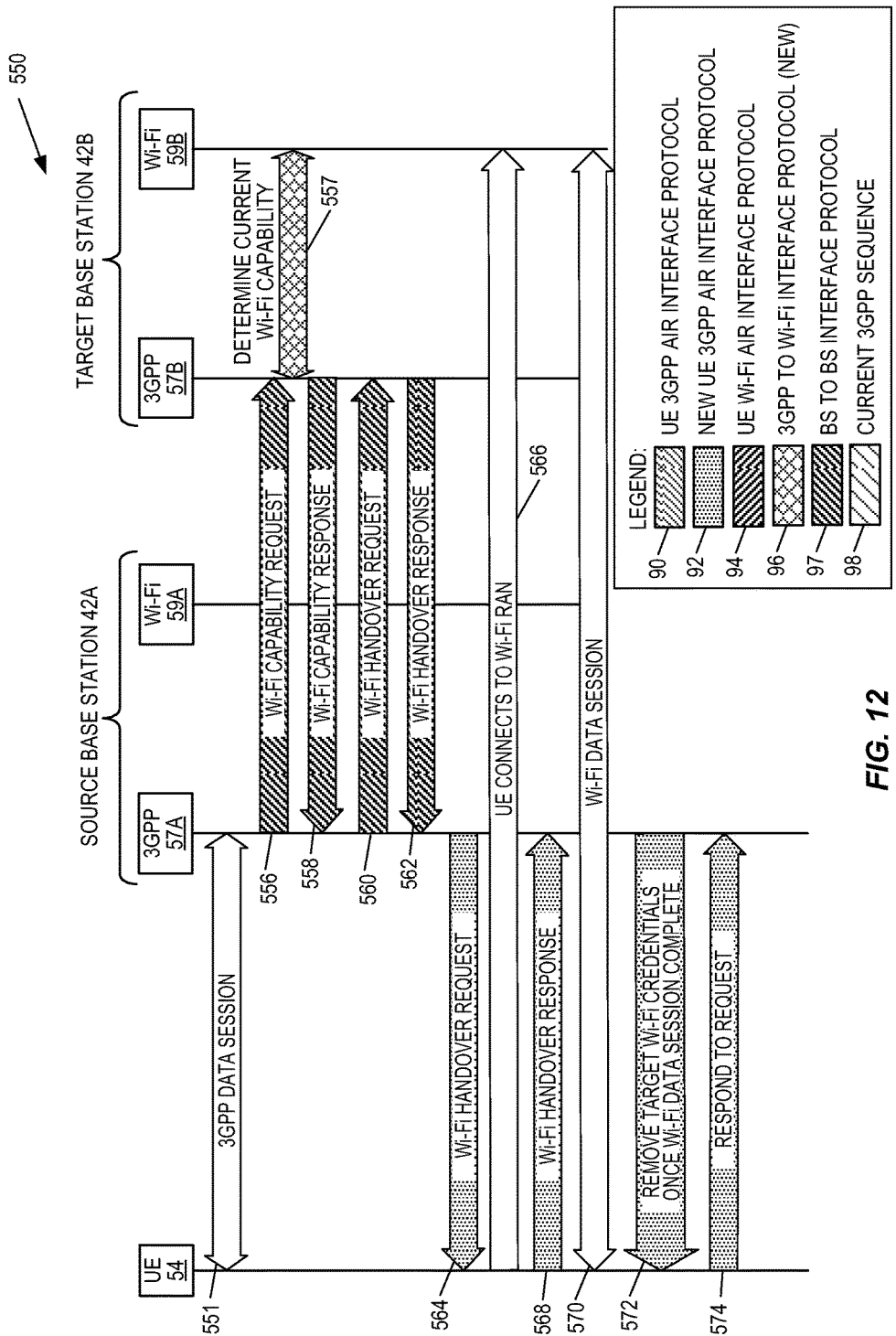
FIG. 12 is a signaling diagram illustrating a 3GPP RAN to Wi-Fi RAN handover sequence that incorporates aspects of at least one of FIGS. 6A and 6B.

FIG. 12 is a signaling diagram 550 illustrating a 3GPP RAN to Wi-Fi RAN handover sequence that incorporates aspects of at least one of FIGS. 6A-B. The UE 54 has an ongoing 3GPP data session with the 3GPP RAN of the source base station 42A (301). The 3GPP processor 57A of the source base station 42A, based on a trigger event, sends a Wi-Fi capability request to 3GPP processor 57B of the target base station 42B. Items 556, 557, 558, 560, and 562 correspond to items 306, 307, 308, 310, and 312, respectively of FIG. 7. To briefly summarize, 3GPP processor 57A transmits a Wi-Fi Capability Request to target base station 42B (556), the 3GPP processor 57B of target base station 42B determines a current Wi-Fi capability of its associated Wi-Fi processor 59B (557), and the 3GPP processor 57B then transmits a corresponding Wi-Fi Capability Response (558) that indicates whether the target base station 42B has an associated Wi-Fi RAN, and if so whether that associated Wi-Fi RAN has sufficient available resources to support QoS requirements of the UE 54.

Assuming the target base station 42B does have an associated Wi-Fi RAN that has sufficient available resources to meet QoS requirements of the UE 54, the 3GPP processor 57A transmits a request to the target base station 42B which indicates a Wi-Fi capability of the UE, a MAC address of the UE, and a current session type (in this example Wi-Fi) (560), and in response receives Wi-Fi credentials for the Wi-Fi RAN associated with the Wi-Fi processor 59B (562). The 3GPP processor 57A then sends, via 3GPP RAN 56 of the source base station 42A, a Wi-Fi handover request (564) to the UE 54 that includes the Wi-Fi credentials for the Wi-Fi RAN 58 of the target base station 42B. The UE attempts to connect to the Wi-Fi RAN 58 of the target base station 42B (566), and based on the attempt sends a corresponding Wi-Fi handover response (568) to the source base station 42A. In FIG. 12, the attempt of 566 is successful, and this is reflected in the response of 568. The UE 54 then continues its data session as a Wi-Fi data session with the Wi-Fi RAN associated with the target base station 42B (570). The base station 42A requests that the UE remove the Wi-Fi credentials for the Wi-Fi RAN 58 associated with the target base station 42B (572) once the Wi-Fi data session 570 is terminated (or handed over away from the target base station 42B or its colocated access point). The UE 54 responds by confirming receipt of the request (574). Once the Wi-Fi session 570 is terminated or handed over (not shown), the UE 54 will then delete the Wi-Fi credentials as requested.

Figure 13:
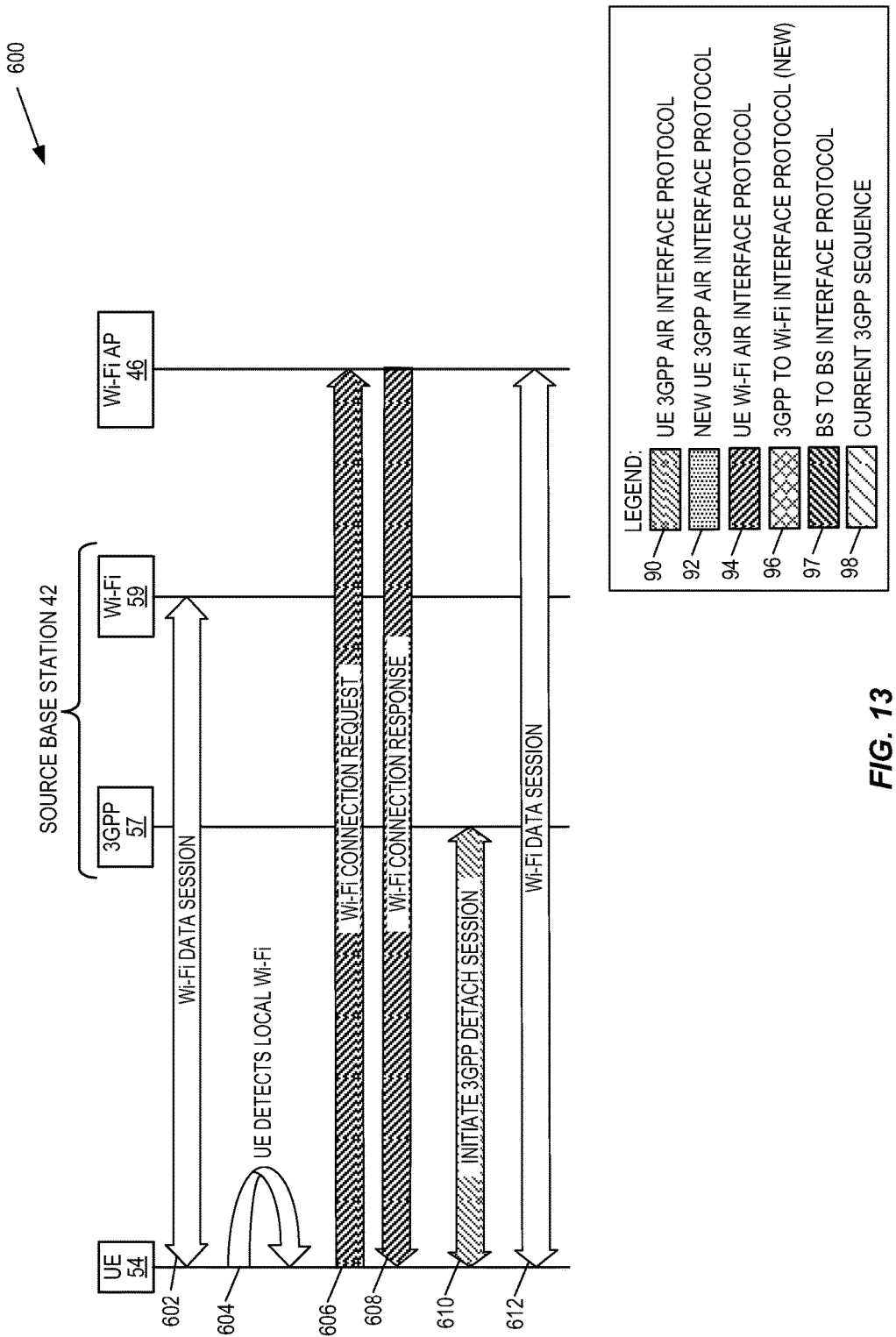
FIG. 13 is a signaling diagram illustrating a Wi-Fi RAN to local Wi-Fi RAN handover sequence that incorporates aspects of at least one of FIGS. 6A and 6B.

FIG. 13 is a signaling diagram 600 illustrating a Wi-Fi RAN to local Wi-Fi RAN handover sequence that incorporates aspects of at least one of FIGS. 6A and 6B. UE 54 has an ongoing Wi-Fi data session with Wi-Fi RAN 58 of source base station (supported by Wi-Fi processor 59). The UE 54 detects a local Wi-Fi RAN 58' which is either open, or for which it has Wi-Fi credentials (604). The local Wi-Fi RAN is supported by Wi-Fi access point 46 (e.g., home router providing Internet access via an ISP). The UE 54 sends a Wi-Fi connection request to the Wi-Fi AP 46 (606), and receives a corresponding Wi-Fi connection response (608) which indicates that the UE is connected to the local Wi-Fi RAN. The UE 54 then initiates a 3GPP detach session via the 3GPP RAN 56 (supported by 3GPP processor 57) of source base station 42 (610). The details of item 610 are well known to those of ordinary skill in the art, and therefore will not be described in detail herein. The UE then continues its Wi-Fi data session with the local Wi-Fi RAN 58' (612). Offloading from Wi-Fi RAN 58 to local Wi-Fi RAN 58' may be desirable as it can free up additional resources of the source base station 42 (or a colocated access point).

Figure 15:
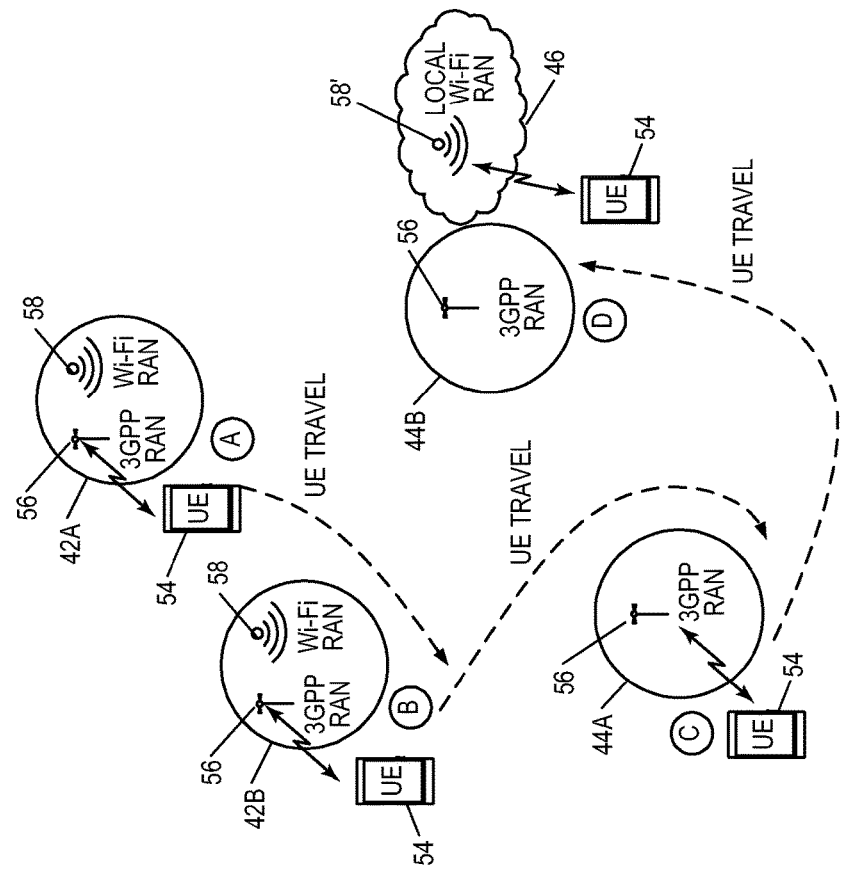
FIGS. 14-15 illustrates example use cases in which 3GPP RANs and Wi-Fi RANs work seamlessly with each other to provide continued service to a UE.
Figure 14:
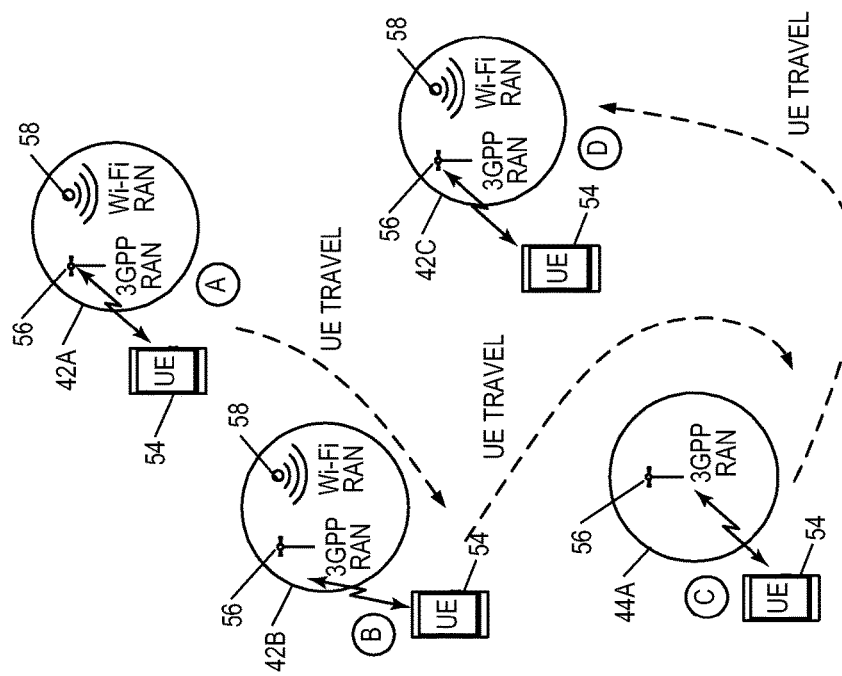

FIGS. 14-15 illustrate some example use cases in which 3GPP RANs 56 and Wi-Fi RANs 58 work seamlessly with each other to provide continued service to a UE 54, while advantageously offloading from the 3GPP RANs 56 whenever possible. For convenience, similar reference numerals are used in FIGS. 14-15 as are used in FIG. 1 to indicate similar elements. Referring to FIG. 14, UE 54 has an ongoing Wi-Fi data session with Wi-Fi RAN 58 of base station 42A (see "A"), but then moves to be in proximity to base station 42B. Base station 42B has an associated Wi-Fi RAN 58 which has sufficient available resources to support QoS requirements of the UE 54. Thus, the Wi-Fi data session is handed over to Wi-Fi RAN 58 of base station 42B (see "B"). The UE 54 then moves in proximity a base station which does not have an associated Wi-Fi RAN (e.g., base station 44A). As a result, the UE's Wi-Fi data session switches to a 3GPP data session with 3GPP RAN 56 of base station 44A (see "C"). The UE 54 the moves in proximity to a base station 42C which has an associated Wi-Fi RAN 58 which has sufficient available resources to support QoS requirements of the UE 54, and the 3GPP data session switches to a Wi-Fi data session with Wi-Fi RAN 58 of the base station 42C (see "D"). In an alternative embodiment, item "C" could correspond to the UE moving into proximity of a base station which has an associated Wi-Fi RAN that lacks sufficient available resources to support QoS requirements of the UE 54.

Referring now to FIG. 15, items "A", "B", and "C" are the same. These figures differ at item "D". In FIG. 15, at "D" the UE moves in proximity to base station 44B which lacks an associated Wi-Fi RAN. However, a local Wi-Fi RAN 58' is available which is either open, or for which the UE 54 has credentials. As a result, the 3GPP data session of the UE 54 switches to a local Wi-Fi data session with local Wi-Fi RAN 58' (see "D"). In an alternative embodiment, item "D" could correspond to the UE moving into proximity of a base station which has an associated Wi-Fi RAN that lacks sufficient available resources to support QoS requirements of the UE 54. As yet another alternative, item "D" could correspond to the UE moving into proximity to a base station which has an associated Wi-Fi RAN 58 which does have sufficient available resources to support QoS requirements of the UE and possibly even handing over to that Wi-Fi RAN 58 (e.g., as shown in FIG. 12), but the UE still hands over to the local Wi-Fi 58' (e.g., as shown in FIG. 13. FIGS. 14-15 illustrate how the techniques described herein can be used to provide seamless interworking between 3GPP and Wi-Fi RANs.

Figure 16A:
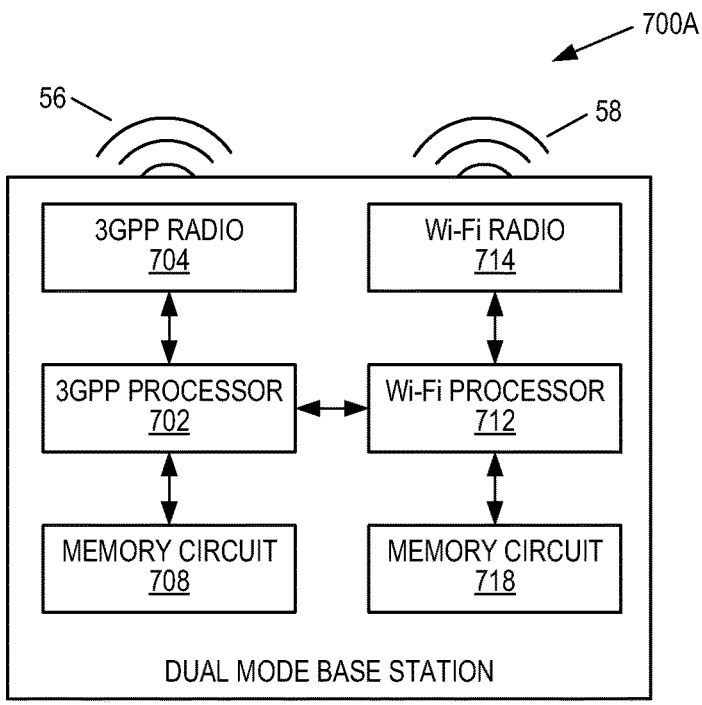
FIG. 16A illustrates an example base station that supports both a 3GPP RAN and a Wi-Fi RAN.

FIG. 16A illustrates an example dual mode base station 700A that supports both a 3GPP RAN 56 and a Wi-Fi RAN 58. The base station 700A includes one or more processing circuits configured as a 3GPP processor 702 configured to support the 3GPP RAN 56 via a 3GPP radio 704. The one or more processing circuits of the 3GPP processor 702 may include, for example, one or more microprocessors, microcontrollers, digital signal processors, or the like, configured with appropriate software and/or firmware to carry out one or more of the techniques discussed above. The 3GPP processor 702 may be used as the 3GPP circuitry 57 discussed above, for example. The 3GPP processor 702 has an associated memory circuit 708, which may comprise one or several types of memory such as read-only memory (ROM), random-access memory, cache memory, flash memory devices, optical storage devices, etc. The memory circuit 708 includes program instructions for executing one or more 3GPP protocols, as well as instructions for carrying out one or more of the techniques described herein.

The base station 700A also includes one or more processing circuits configured as a Wi-Fi processor 712 configured to support a Wi-Fi RAN 58 via a Wi-Fi radio 714. The one or more processing circuits of the Wi-Fi processor 712 may include, for example, one or more microprocessors, microcontrollers, digital signal processors, or the like, configured with appropriate software and/or firmware to carry out one or more of the techniques discussed above. The Wi-Fi processor 712 may be used as the Wi-Fi circuitry 59 discussed above, for example. The Wi-Fi processor 712 has an associated memory circuit 718, which may comprise one or several types of memory such as read-only memory (ROM), random-access memory, cache memory, flash memory devices, optical storage devices, etc. The memory circuit 718 includes program instructions for executing one or more 802.11 Wi-Fi protocols, as well as instructions for carrying out one or more of the techniques described herein.

Figure 16B:
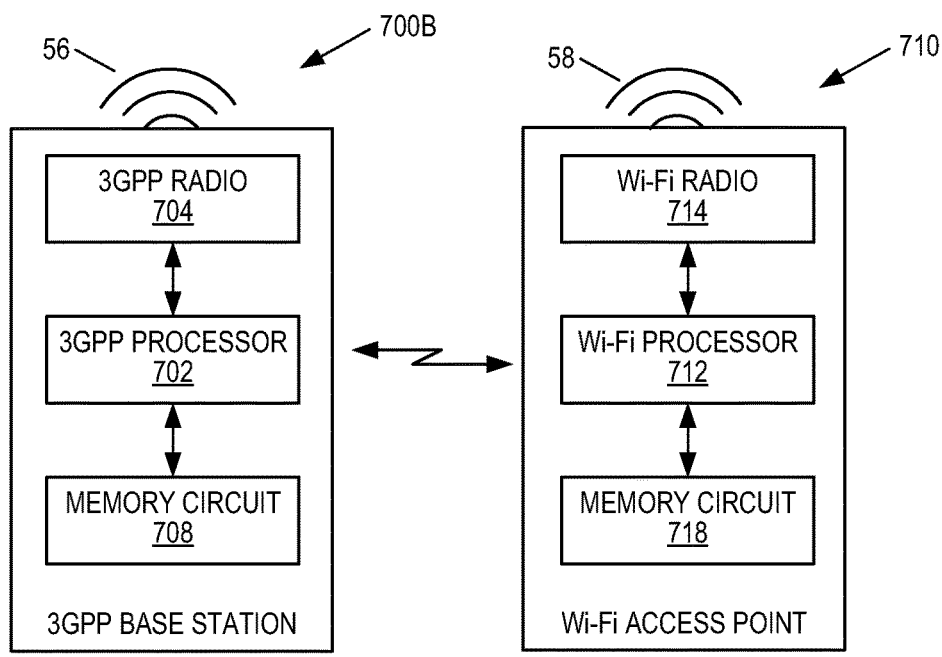
FIG. 16B illustrates an example base station that supports a 3GPP RAN and has a colocated access point that supports a Wi-Fi RAN.

FIG. 16B illustrates an alternative embodiment of the base station 700B, in which the Wi-Fi processor 712, Wi-Fi radio 714, and memory circuit 718 are separate from but colocated with the base station 700B. Thus, in the embodiment of FIG. 16B, the base station 700B supports a 3GPP RAN 56 and has a colocated access point 710 that supports a Wi-Fi RAN 58, whereas in FIG. 16A the base station 700A supports both the 3GPP RAN 56 and the Wi-Fi RAN 58. The base stations 700A, 700B will be generally referred to as base station 700 below.

The base station 700 may be configured as the base stations 42 and/or 44 shown in FIG. 1, for example. The base station 700 may be configured to implement any combination of the features in shown in any of FIG. 2-4, 6-8, or 10-14, for example. In each of the embodiments discussed below, it is understood that the base station 700 supports a 3GPP RAN 56 and has an associated Wi-Fi RAN 58 that is either supported by the base station 700 (FIG. 16A) or is supported by an access point 710 that is colocated with the base station 700 (FIG. 16B).

In one example embodiment, the one or more processing circuits of the 3GPP processor 702 are configured to receive a request from a UE 54, and if the request is a request for a current Wi-Fi service capability of the base station 700, to:
  determine, based on the request, whether the Wi-Fi RAN 58 has sufficient available resources to support QoS requirements of the UE; and
  transmit a corresponding response to the UE 54 based on the determining which indicates whether the Wi-Fi RAN 58 has sufficient available resources to support QoS requirements of the UE 54.

If the response indicates that the Wi-Fi RAN 58 has sufficient available resources to support the QoS requirements of the UE 54, the one or more processing circuits of the 3GPP processor 702 are configured to transmit Wi-Fi credentials to the UE 54 to enable the UE 54 to access the Wi-Fi RAN 58. However, if the response indicates that the Wi-Fi RAN 58 does not have sufficient available resources to support the QoS requirements of the UE 54, or if the request is a request to access the 3GPP RAN 56, the base station 700 attempts to enable the UE 54 to access the 3GPP RAN 56 and does not transmit Wi-Fi credentials to the UE 54 for the Wi-Fi RAN 58.

In the same or another embodiment, the base station 700 acts as a source base station with respect to a target base station. Here, the one or more processing circuits of the 3GPP processor 702 are configured to determine that a data session between UE 54 and the Wi-Fi RAN 58 of the base station 700 needs to be handed over; and to transmit, based on the determining, a request to the target base station that supports a 3GPP RAN to determine a current Wi-Fi service capability of the target base station. The 3GPP processor 702 is further configured to receive a response from the target base station that indicates the current Wi-Fi service capability of the target base station, and to transmit a handover request to the UE 54 based on the response. The handover request includes one of:

- a request that the UE 54 handover the data session to the 3GPP RAN of the target base station; or
- a request that the UE 54 handover the data session to a Wi-Fi RAN of the target base station that is either supported by the target base station or is supported by an access point that is colocated with the target base station.

In one or more embodiments, the base station 700 acts as a target base station with respect to a source base station. Here, the one or more processing circuits of the 3GPP processor 702 are configured to receive a request from a source base station to indicate a Wi-Fi capability of the target base station 700. The source base station supports a 3GPP RAN and has an associated Wi-Fi RAN that is either supported by the source base station or is supported by an access point that is colocated with the source base station. The received request includes QoS requirements of a UE 54 participating in a data session with the Wi-Fi RAN of the source base station. The one or more processing circuits of the 3GPP processor 702 are further configured to determine, based on the request, whether the Wi-Fi RAN 58 of the target base station 700 has sufficient available resources to support the QoS requirements of the UE 54; and to transmit a corresponding response to the source base station that indicates that the target base station 700 supports a Wi-Fi RAN 58, and that indicates, based on the determining, whether the target base station 700 has sufficient available resources to support the QoS requirements of the UE 54.

Figure 17:
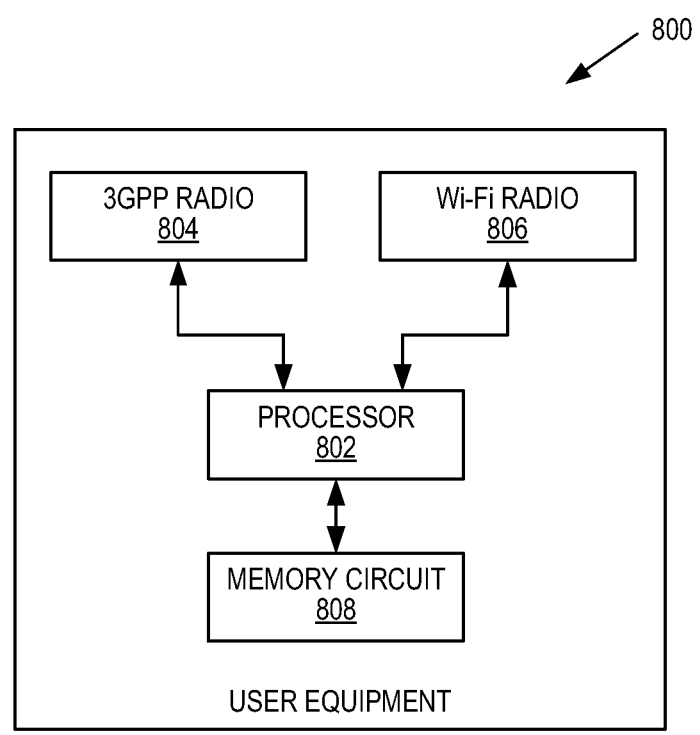
FIG. 17 illustrates an example user equipment that has 3GPP and Wi-Fi capabilities.

FIG. 17 illustrates an example user equipment (UE) 800 that has 3GPP and Wi-Fi capabilities. That is, the UE is capable of supporting a session with a 3GPP RAN 56 and is also capable of supporting a session with a Wi-Fi RAN 58. The UE may be used as the UE 54 discussed above, for example. The UE 800 may be configured to implement any combination of the UE features shown in any of FIG. 2-3, 5-7, 9, or 11-14, for example. The UE 800 includes one or more processing circuits (shown as processor 802) configured to support a session with a 3GPP RAN 56 via a 3GPP radio 804, and configured to support a session with a Wi-Fi RAN 58 via a Wi-Fi radio 806. The one or more processing circuits 802 may include, for example, one or more microprocessors, microcontrollers, digital signal processors, or the like, configured with appropriate software and/or firmware to carry out one or more of the techniques discussed above. The one or more processing circuits 802 have an associated memory circuit 808, which may comprise one or several types of memory such as read-only memory (ROM), random-access memory, cache memory, flash memory devices, optical storage devices, etc. The memory circuit 808 includes program instructions for executing one or more 3GPP protocols, as well as instructions for executing one or more 802.11 Wi-Fi protocols, as well as instructions for carrying out one or more of the techniques described herein.

In one example, the one or more processing circuits 802 are configured to send a request to a base station that supports a 3GPP RAN to determine a current Wi-Fi service capability of the base station, wherein the request is sent via the 3GPP RAN 56. The one or more processing circuits 802 are further configured to receive, via the 3GPP RAN 56, a corresponding response from the base station indicating whether the base station has an associated Wi-Fi RAN 58 that is either supported by the base station (see, e.g., FIG. 16A) or is supported by an access point that is colocated with the base station (see, e.g., FIG. 16B). If the base station does have an associated Wi-Fi RAN, the response also indicates whether the Wi-Fi RAN has sufficient available resources to support QoS requirements of the UE 800. The one or more processing circuits 802 are further configured to, if the response indicates that the Wi-Fi RAN of the base station exists and has sufficient available resources to support QoS requirements of the UE 800, subsequently receive Wi-Fi credentials for the Wi-Fi RAN 58 over the 3GPP RAN 56, and attempt to establish a data session with the Wi-Fi RAN 58 using the Wi-Fi credentials.

In the same or another embodiment, the one or more processing circuits 802 are configured to participate in a data session with a Wi-Fi RAN 58 that is either supported by a source base station 700 or is supported by an access point that is colocated with the source base station, wherein the source base station also supports a 3GPP RAN. The one or more processing circuits 802 are configured to receive a handover request from the source base station 700, with the handover request comprising one of the following:

- a request that the UE 800 handover the data session to a 3GPP RAN 56 of a target base station; or
- a request that the UE 800 handover the data session to a Wi-Fi RAN 58 of the target base station that is either supported by the target base station or is supported by an access point that is colocated with the target base station.

The one or more processing circuits 802 are further configured to hand over the data session based on the handover request.

The methods and apparatus described above offer a number of advantages over prior art solutions. For example, they may be based on extending current, internationally adopted standards (i.e., 3GPP and 802.11 standards), and support both data offloading and mobility/handover within these two types of RANs (i.e., 3GPP RANs and Wi-Fi RANs). Although some LTE terminology (e.g., eNodeB) is used above, the teachings above can be adapted to all 3GPP based standards. They may enable service providers to offer different level of services based on QoS requirements of a given UE. Moreover, no new network equipment is needed to implement the teachings above, only software changes are required. Advantageously, legacy UEs that only use voice calling and omit data features are also supported by the base station configurations discussed above. As such, the present disclosure offers a cost effective way to address network congestion to service providers.

It is understood that in some embodiments, the actions noted in the blocks of the flowcharts and signaling diagrams above may occur out of the order noted in the figures. For example, two blocks shown in succession may, in fact, be executed substantially concurrently, or the blocks may sometimes be executed in the reverse order, depending upon

What is claimed is:

1. A method implemented by a base station that supports a 3rd Generation Partnership Project (3GPP) radio access network (RAN) and has an associated Wi-Fi RAN that is either supported by the base station or is supported by an access point that is colocated with the base station, the method comprising:
   receiving a request from a user equipment (UE); and
   if the request from the UE requests a current Wi-Fi service capability of the base station:
      determining, based on the request from the UE, whether the Wi-Fi RAN has sufficient available resources to support Quality of Service (QoS) requirements of the UE; and
      transmitting a corresponding response to the UE based on the determining which indicates whether the Wi-Fi RAN has sufficient available resources to support the QoS requirements of the UE;
   wherein if the response indicates that the Wi-Fi RAN has sufficient available resources to support the QoS requirements of the UE, the base station transmits a request to the UE which requests that the UE enable its Wi-Fi features, and Wi-Fi credentials to the UE to enable the UE to access the Wi-Fi RAN; and
   wherein if the response indicates that the Wi-Fi RAN does not have sufficient available resources to support the QoS requirements of the UE or if the request from the UE requests access to the 3GPP RAN, the base station attempts to enable the UE to access the 3GPP RAN and does not transmit Wi-Fi credentials to the UE for the Wi-Fi RAN.

2. The method of claim 1, further comprising:
   if the UE is unable to establish a data session with the Wi-Fi RAN using the Wi-Fi credentials:
      transmitting a request to the UE which requests that the UE delete the Wi-Fi credentials without establishing a data session with the Wi-Fi RAN; and
      attempting to enable the UE to access the 3GPP RAN; and
   if the UE is able to establish a data session with the Wi-Fi RAN using the Wi-Fi credentials, transmitting a request to the UE which requests that the UE delete the Wi-Fi credentials once the data session is terminated or handed over.

3. The method claim 1, further comprising:
   if the UE is not able to establish a data session with the Wi-Fi RAN using the Wi-Fi credentials, transmitting a request to the UE requesting that the UE disable its Wi-Fi features.

4. A method implemented by a source base station that supports a 3rd Generation Partnership Project (3GPP) radio access network (RAN) and has an associated Wi-Fi RAN that is either supported by the source base station or is supported by an access point that is colocated with the source base station, the method comprising:
   determining that a data session between a user equipment and the Wi-Fi RAN of the source base station needs to be handed over;
   transmitting, based on the determining, a request to a target base station that supports a 3GPP RAN to determine a current Wi-Fi service capability of the target base station, the request to the target base station comprising Quality of Service (QoS) requirements of the UE;
   receiving a response from the target base station that indicates the current Wi-Fi service capability of the target base station; and
   transmitting a handover request to the UE based on the response, the handover request comprising one of:
      a request that the UE handover the data session to the 3GPP RAN of the target base station; or
      responsive to the response indicating that the target base station has an associated Wi-Fi RAN, and that the Wi-Fi RAN of the target base station has sufficient available resources to support the QoS requirements of the UE, a request that the UE handover the data session to a Wi-Fi RAN of the target base station that is either supported by the target base station or is supported by an access point that is colocated with the target base station.

5. The method of claim 4, further comprising:
   receiving, from the target base station, Wi-Fi credentials for the Wi-Fi RAN of the target base station; and
   transmitting the Wi-Fi credentials for the Wi-Fi RAN of the target base station to the UE as part of the handover request.

6. The method of claim 5, further comprising:
   transmitting a request to the UE which requests that the UE delete the Wi-Fi credentials after the UE establishes a Wi-Fi session with the Wi-Fi RAN of the target base station using the Wi-Fi credentials and subsequently disconnects from the Wi-Fi RAN of the target base station.

7. The method of claim 5, further comprising:
   transmitting an additional handover request to the target base station which requests Wi-Fi credentials for the Wi-Fi RAN of the target base station; and
   receiving a corresponding handover response from the target base station that includes the Wi-Fi credentials for the Wi-Fi RAN of the target base station.

8. The method of claim 4, wherein the handover request comprises a request that the UE handover the data session to the 3GPP RAN of the target base station, and the method further comprises:
   receiving a handover response from the UE that indicates whether the UE accepts or rejects the handover request; and
   if the handover response from the UE indicates that the UE accepts the handover request, transmitting a request to the UE which requests that the UE disable its Wi-Fi features.

9. The method of claim 4, further comprising:
   subsequent to the transmitting of the handover request to the UE, transmitting a request to the UE requesting that the UE delete Wi-Fi credentials for the Wi-Fi RAN of the source base station.

10. A method implemented by a user equipment that is capable of supporting a session with a 3rd Generation Partnership Project (3GPP) radio access network (RAN) and is also capable of supporting a session with a Wi-Fi RAN, the method comprising:

sending a request to a base station that supports a 3GPP RAN to determine a current Wi-Fi service capability of the base station, wherein the request to the base station is sent via the 3GPP RAN;

receiving, via the 3GPP RAN, a corresponding response from the base station that indicates whether the base station has an associated Wi-Fi RAN that is either supported by the base station or is supported by an access point that is colocated with the base station, and if the base station does have an associated Wi-Fi RAN, the response also indicating whether the Wi-Fi RAN has sufficient available resources to support Quality of Service (QoS) requirements of the UE;

if the response indicates that the base station has an associated Wi-Fi RAN and that the Wi-Fi RAN has sufficient available resources to support the QoS requirements of the UE, subsequently receiving Wi-Fi credentials for the Wi-Fi RAN over the 3GPP RAN, and attempting to establish a data session with the Wi-Fi RAN using the Wi-Fi credentials;

deleting the Wi-Fi credentials based on receiving, via the 3GPP RAN, a request from the base station which requests that the UE delete the Wi-Fi credentials.

11. A method implemented by a user equipment that is capable of supporting a session with a Third Generation Partnership Project (3GPP) radio access network (RAN) and is also capable of supporting a session with a Wi-Fi RAN, the method comprising:

participating in a data session with a Wi-Fi RAN that is either supported by a source base station or is supported by an access point that is colocated with the source base station, wherein the source base station also supports a 3GPP RAN;

receiving a handover request from the source base station, the handover request comprising one of the following:
a request that the UE handover the data session to a 3GPP RAN of a target base station; or
a request that the UE handover the data session to a Wi-Fi RAN of the target base station that is either supported by the target base station or is supported by an access point that is colocated with the target base station; and handing over the data session based on the handover request;

wherein if the handover request comprises the request that the UE handover the data session to the Wi-Fi RAN of the target base station, the handover request includes Wi-Fi credentials for the Wi-Fi RAN of the target base station, and the handing over of the data session comprises handing over the data session to the Wi-Fi RAN of the target base station.

12. The method of claim 11, wherein if the handover request comprises the request that the UE handover the data session to the 3GPP RAN of the target base station, said handing over the data session comprises:

handing over the data session to a Wi-Fi RAN of a secondary Wi-Fi access point that is not the target base station and is not colocated with the source or target base stations if the UE can, at its current location, connect to the secondary Wi-Fi access point; and handing over the data session to the 3GPP RAN of the target base station if the UE cannot, at its current location, connect to a secondary Wi-Fi access point that is not the source base station or the target base station.

13. The method of claim 11, further comprising:

receiving a request from the source base station to delete Wi-Fi credentials for the Wi-Fi RAN of the source base station based on the data session with the Wi-Fi RAN of the source base station being terminated or handed over away from the source base station; and deleting the Wi-Fi credentials for the Wi-Fi RAN of the source base station based on the request to delete the Wi-Fi credentials.

14. A method implemented by a target base station that supports a 3rd Generation Partnership Program (3GPP) radio access network (RAN) and has an associated Wi-Fi RAN that is either supported by the target base station or is supported by an access point that is colocated with the target base station, the method comprising:

receiving a request from a source base station to indicate a Wi-Fi capability of the target base station, wherein the source base station supports a 3GPP RAN and has an associated Wi-Fi RAN that is either supported by the source base station or is supported by an access point that is colocated with the source base station, and wherein the request includes Quality of Service (QoS) requirements of a UE participating in a data session with the Wi-Fi RAN of the source base station;

determining, based on the request, whether the Wi-Fi RAN of the target base station has sufficient available resources to support the QoS requirements of the UE; and transmitting a corresponding response to the source base station that indicates that the target base station supports a Wi-Fi RAN, and that indicates, based on the determining, whether the target base station has sufficient available resources to support the QoS requirements of the UE;

transmitting Wi-Fi credentials for the Wi-Fi RAN of the target base station to the source base station if the determining indicates that the Wi-Fi RAN of the target base station has sufficient available resources to support the QoS requirements of the UE.

15. A base station that supports a 3rd Generation Partnership Project (3GPP) radio access network (RAN) and has an associated Wi-Fi RAN that is either supported by the base station or is supported by an access point that is colocated with the base station, the base station comprising:

a radio circuit configured to support the 3GPP RAN; and
one or more processing circuits communicatively connected to the radio circuit, and configured to:
receive a request from a user equipment (UE); and
if the request from the UE requests a current Wi-Fi service capability of the base station:
determine, based on the request from the UE, whether the Wi-Fi RAN has sufficient available resources to support Quality of Service (QoS) requirements of the UE; and
transmit a corresponding response to the UE based on the determining which indicates whether the Wi-Fi RAN has sufficient available resources to support the QoS requirements of the UE;

wherein if the response indicates that the Wi-Fi RAN has sufficient available resources to support the QoS requirements of the UE, the base station transmits a request to the UE which requests that the UE enable its Wi-Fi features, and Wi-Fi credentials to the UE to enable the UE to access the Wi-Fi RAN; and wherein if the response indicates that the Wi-Fi RAN does not have sufficient available resources to support the QoS requirements of the UE or if the request from the UE requests access to the 3GPP RAN, the one or more processing circuits are configured to attempt to enable the UE to access the 3GPP RAN and the base station does not transmit Wi-Fi credentials to the UE for the Wi-Fi RAN.

16. The base station of claim 15, wherein the one or more processing circuits are further configured to:
if the UE is unable to establish a data session with the Wi-Fi RAN using the Wi-Fi credentials:
transmit a request to the UE which requests that the UE delete the Wi-Fi credentials without establishing a data session with the Wi-Fi RAN; and
attempt to enable the UE to access the 3GPP RAN; and
if the UE is able to establish a data session with the Wi-Fi RAN using the Wi-Fi credentials, transmit a request to the UE which requests that the UE delete the Wi-Fi credentials once the data session is terminated or handed over.

17. The base station claim 15, wherein the one or more processing circuits are further configured to:
if the UE is not able to establish a data session with the Wi-Fi RAN using the Wi-Fi credentials, transmit a request to the UE requesting that the UE disable its Wi-Fi features.

18. A source base station that supports a 3rd Generation Partnership Project (3GPP) radio access network (RAN) and has an associated Wi-Fi RAN that is either supported by the source base station or is supported by an access point that is colocated with the source base station, the source base station comprising:
a radio circuit configured to support the 3GPP RAN; and
one or more processing circuits communicatively connected to the radio circuit, and configured to:
determine that a data session between a user equipment and the Wi-Fi RAN of the source base station needs to be handed over;
transmit, based on the determining, a request to a target base station that supports a 3GPP RAN to determine a current Wi-Fi service capability of the target base station, the request to the target base station comprising Quality of Service (QoS) requirements of the UE;
receive a response from the target base station that indicates the current Wi-Fi service capability of the target base station; and
transmit a handover request to the UE based on the response, the handover request comprising one of:
a request that the UE handover the data session to the 3GPP RAN of the target base station; or
responsive to the response indicating that the target base station has an associated Wi-Fi RAN, and that the Wi-Fi RAN of the target base station has sufficient available resources to support the QoS requirements of the UE, a request that the UE handover the data session to a Wi-Fi RAN of the target base station that is either supported by the target base station or is supported by an access point that is colocated with the target base station.

19. The source base station of claim 18, wherein the one or more processing circuits are further configured to:
receive, from the target base station, Wi-Fi credentials for the Wi-Fi RAN of the target base station; and
transmit the Wi-Fi credentials for the Wi-Fi RAN of the target base station to the UE as part of the handover request.

20. The source base station of claim 19, wherein the one or more processing circuits are further configured to:
transmit a request to the UE which requests that the UE delete the Wi-Fi credentials after the UE establishes a Wi-Fi session with the Wi-Fi RAN of the target base station using the Wi-Fi credentials and subsequently disconnects from the Wi-Fi RAN of the target base station.

21. The source base station of claim 19, wherein the one or more processing circuits are further configured to:
transmit an additional handover request to the target base station which requests Wi-Fi credentials for the Wi-Fi RAN of the target base station; and
receive a corresponding handover response from the target base station that includes the Wi-Fi credentials for the Wi-Fi RAN of the target base station.

22. The source base station of claim 18, wherein the handover request comprises a request that the UE handover the data session to the 3GPP RAN of the target base station, and the one or more processing circuits are further configured to:
receive a handover response from the UE that indicates whether the UE accepts or rejects the handover request; and
if the handover response from the UE indicates that the UE accepts the handover request, transmit a request to the UE which requests that the UE disable its Wi-Fi features.

23. The source base station of claim 18, wherein the one or more processing circuits are further configured to:
subsequent to the transmission of the handover request to the UE, transmit a request to the UE requesting that the UE delete Wi-Fi credentials for the Wi-Fi RAN of the source base station.

24. A user equipment that is capable of supporting a session with a 3rd Generation Partnership Project (3GPP) radio access network (RAN) and is also capable of supporting a session with a Wi-Fi RAN, the user equipment comprising:
a 3GPP radio circuit configured to communicate via the 3GPP RAN;
a Wi-Fi radio circuit configured to communicate via the Wi-Fi RAN; and
one or more processing circuits communicatively connected to the radio circuits and configured to:
send a request to a base station that supports a 3GPP RAN to determine a current Wi-Fi service capability of the base station, wherein the request to the base station is sent via the 3GPP RAN;
receive, via the 3GPP RAN, a corresponding response from the base station that indicates whether the base station has an associated Wi-Fi RAN that is either supported by the base station or is supported by an access point that is colocated with the base station, and if the base station does have an associated Wi-Fi RAN, the response also indicating whether the Wi-Fi RAN has sufficient available resources to support Quality of Service (QoS) requirements of the UE;
if the response indicates that the base station has an associated Wi-Fi RAN and that the Wi-Fi RAN has sufficient available resources to support the QoS requirements of the UE, subsequently receive Wi-Fi credentials for the Wi-Fi RAN over the 3GPP RAN, and attempt to establish a data session with the Wi-Fi RAN using the Wi-Fi credentials;
delete the Wi-Fi credentials based on receiving, via the 3GPP RAN, a further request from the base station which requests that the UE delete the Wi-Fi credentials.

25. A user equipment that is capable of supporting a session with a 3rd Generation Partnership Project (3GPP) radio access network (RAN) and is also capable of supporting a session with a Wi-Fi RAN, the user equipment comprising:
 a 3GPP radio circuit configured to communicate via the 3GPP RAN;
 a Wi-Fi radio circuit configured to communicate via the Wi-Fi RAN; and
 one or more processing circuits communicatively connected to the radio circuits and configured to:
  participate in a data session with a Wi-Fi RAN that is either supported by a source base station or is supported by an access point that is colocated with the source base station, wherein the source base station also supports a 3GPP RAN;
  receive a handover request from the source base station, the handover request comprising one of the following:
   a request that the UE handover the data session to a 3GPP RAN of a target base station; or
   a request that the UE handover the data session to a Wi-Fi RAN of the target base station that is either supported by the target base station or is supported by an access point that is colocated with the target base station; and
  hand over the data session based on the handover request;
  wherein if the handover request comprises the request that the UE handover the data session to the Wi-Fi RAN of the target base station, the handover request includes Wi-Fi credentials for the Wi-Fi RAN of the target base station, and to hand over the data session the one or more processing circuits are configured to hand over the data session to the Wi-Fi RAN of the target base station.

26. The user equipment of claim 25, wherein if the handover request comprises the request that the UE handover the data session to the 3GPP RAN of the target base station, to hand over the data session, the one or more processing circuits are configured to:
 hand over the data session to a Wi-Fi RAN of a secondary Wi-Fi access point that is not the target base station and is not colocated with the source or target base stations if the UE can, at its current location, connect to the secondary Wi-Fi access point; and
 hand over the data session to the 3GPP RAN of the target base station if the UE cannot, at its current location, connect to a secondary Wi-Fi access point that is not the source base station or the target base station.

27. The user equipment of claim 25, wherein the one or more processing circuits are further configured to:
 receive a request from the source base station to delete Wi-Fi credentials for the Wi-Fi RAN of the source base station based on the data session with the Wi-Fi RAN of the source base station being terminated or handed over away from the source base station; and
 delete the Wi-Fi credentials for the Wi-Fi RAN of the source base station based on the request to delete the Wi-Fi credentials.

28. A target base station that supports a 3rd Generation Partnership Project (3GPP) radio access network (RAN) and has an associated Wi-Fi RAN that is either supported by the target base station or is supported by an access point that is colocated with the target base station, the target base station comprising:
 a radio circuit configured to support the 3GPP RAN; and
 one or more processing circuits communicatively connected to the radio circuit, and configured to:
  receive a request from a source base station to indicate a Wi-Fi capability of the target base station, wherein the source base station supports a 3GPP RAN and has an associated Wi-Fi RAN that is either supported by the source base station or is supported by an access point that is colocated with the source base station, and wherein the request includes Quality of Service (QoS) requirements of a UE participating in a data session with the Wi-Fi RAN of the source base station;
  determine, based on the request, whether the Wi-Fi RAN of the target base station has sufficient available resources to support the QoS requirements of the UE; and
  transmit a corresponding response to the source base station that indicates that the target base station supports a Wi-Fi RAN, and that indicates, based on the determining, whether the target base station has sufficient available resources to support the QoS requirements of the UE;
  transmit Wi-Fi credentials for the Wi-Fi RAN of the target base station to the source base station if the determining indicates that the Wi-Fi RAN of the target base station has sufficient available resources to support the QoS requirements of the UE.

* * * * *